(12) United States Patent
Kamijo et al.

(10) Patent No.: US 7,929,613 B2
(45) Date of Patent: Apr. 19, 2011

(54) METHOD AND DEVICE FOR TRACKING MOVING OBJECTS IN IMAGE

(75) Inventors: Shunsuke Kamijo, Kawasaki (JP);
Masao Sakauchi, Yokohama (JP)

(73) Assignee: The Foundation for the Promotion of Industrial Science, Tokyo (JP)

( * ) Notice: Subject to any disclaimer, the term of this patent is extended or adjusted under 35 U.S.C. 154(b) by 1647 days.

(21) Appl. No.: 10/540,217

(22) PCT Filed: Dec. 15, 2003

(86) PCT No.: PCT/JP03/16058
§ 371 (c)(1),
(2), (4) Date: Jun. 20, 2005

(87) PCT Pub. No.: WO2004/057537
PCT Pub. Date: Jul. 8, 2004

(65) Prior Publication Data
US 2006/0092280 A1 May 4, 2006

(30) Foreign Application Priority Data
Dec. 20, 2002 (JP) ................................. 2002-371047

(51) Int. Cl.
*H04N 7/50* (2006.01)
*H04N 7/48* (2006.01)
(52) U.S. Cl. .......... 375/240.24; 375/240.16; 375/240.08
(58) Field of Classification Search ............. 375/240.08, 375/240.16, 240.24
See application file for complete search history.

(56) References Cited

U.S. PATENT DOCUMENTS

| | | | | |
|---|---|---|---|---|
| 6,289,049 B1 * | 9/2001 | Kim et al. | ................ | 375/240.16 |
| 6,307,885 B1 * | 10/2001 | Moon et al. | .............. | 375/240.08 |
| 6,594,310 B1 * | 7/2003 | Marques et al. | .............. | 375/240 |
| 7,367,042 B1 * | 4/2008 | Dakss et al. | ..................... | 725/60 |
| 2003/0086490 A1 * | 5/2003 | Hori et al. | ................ | 375/240.08 |
| 2003/0161399 A1 * | 8/2003 | Ali | ............................ | 375/240.08 |

FOREIGN PATENT DOCUMENTS

JP 09-185720 7/1997
JP 2002-133421 5/2002

OTHER PUBLICATIONS

Alan J. Lipton et al., _Moving Target Classification and Tracking from Real-time Video_, Proc. of the 1998 DARPA Image Understanding Workshop 8-4 (Nov. 1998).*

* cited by examiner

*Primary Examiner* — Joseph G Ustaris
*Assistant Examiner* — David N Werner
(74) *Attorney, Agent, or Firm* — Browdy and Neimark, PLLC

(57) ABSTRACT

To track moving objects in a smaller number of temporarily stored time-series pictures, regarding N consecutive pictures (N≧2) within the time-series pictures, a method comprises the steps of: (a) by assigning the same ID to adjacent blocks if the absolute value of the difference between motion vectors of the blocks are less than a predetermined value, assigning different IDs to moving objects overlapping in a picture; (b) judging whether or not a first object of a first block group assigned a first ID and a second object of a second block group assigned a second ID are in contact with each other in each of the N consecutive pictures, and further each correlation between the first objects of temporally adjacent pictures in the N consecutive pictures is more than or equal to a predetermined value; and (c) tracking the first and second objects backward in time after the judgment at step (b) is positive.

8 Claims, 28 Drawing Sheets t−1
(A)

t
(B)

(A) t-1

(B) t (A) t−1

(B) t (A)

(B)

(A) t−1

(B) t (A)

(B)

(A)

(B)

(A)

(B)

t=1 t=2 t=3 t=4

METHOD AND DEVICE FOR TRACKING MOVING OBJECTS IN IMAGE

TECHNICAL FIELD

The present invention relates to a method and apparatus for tracking moving objects (i.e., movable things such as cars, bicycles, and animals) in pictures by processing time-series pictures to track the moving objects therein.

BACKGROUND ART

Early detection of a traffic accident not only enhances a success rate in life saving by fast rescue operation, but also alleviates accident-related traffic congestion by speedup of the police inspection at the site. Therefore, various types of automation in recognition of traffic accident are expected. In order to achieve a high recognition rate of traffic accidents, it is necessary to correctly track moving objects by processing pictures captured by a camera.

FIG. 28 schematically illustrates pictures at times t=1 to 4 captured by a camera disposed above a halfway line of an expressway.

Since vehicles frequently overlap with each other in the captured pictures, it is difficult to track each vehicle by image processing. To overcome this problem, there is a need to dispose a plurality of cameras along the road and then to synthetically process all pictures captured by the cameras.

However, the necessity to install a plurality of cameras and image processors increases costs. In addition, the necessity to associate and synthetically process pictures captured by the cameras makes the processing complicated.

To overcome these problems, the present inventors have disclosed a method of tracking moving objects in pictures backward in time in the following manner (Japanese Patent Application Publication No. 2002-133421).

Time-series pictures at times t=1 to 4 are temporarily stored. Starting from time t=4, vehicles M1 and M2 are identified, and motion vectors of the vehicles M1 and M2 are determined. Images of the vehicles M1 and M2 in the picture at time t=4 are moved with the determined motion vectors to estimate a corresponding picture at t=3 in which the vehicles M1 and M2 are identified. Based on the correlation between the estimated picture and the actual picture at t=3, the vehicles M1 and M2 are identified in the picture at t=3.

Next, the same process is performed for the pictures at t=3 and t=2, so that the vehicles M1 and M2 are identified in the picture at t=2. Then, the same process is performed for the pictures at t=2 and t=1, so that the vehicles M1 and M2 are identified in the picture at t=1.

This method makes it possible to track vehicles M1 and M2 using a single camera.

However, in actuality, since pictures are processed at a rate of, for example, 12 frames/sec, there are disadvantages in that a large storage capacity is required for the time-series pictures, and the processing time is also increased.

In addition, if the size of each image block is reduced to improve the accuracy of recognition of the boundary of moving object, there arises a problem that it is difficult to determine motion vectors with block matching.

In the above Japanese Patent Application Publication No. 2002-133421, each captured picture is divided into blocks, each of which has a size of, for example, 8×8 pixels, and the image of each block of a captured picture and the image of a corresponding block of a separate background picture are compared to determine whether or not an moving object is present in the block.

The background picture must be updated since it varies with time. Regarding all the pictures captured for the past 10 minutes, for example, a histogram of the pixel values of a corresponding pixel position is made for each pixel position, and a picture, each pixel value of which is equal to the most frequent pixel value (i.e., mode) of the corresponding histogram, is defined as a background picture.

DISCLOSURE OF THE INVENTION

Taking these problems into consideration, it is an object of the present invention to provide a method and apparatus for tracking moving objects in pictures, which makes it possible to track moving objects with a smaller number of temporarily stored time-series pictures.

It is another object of the present invention to provide a method and apparatus for tracking moving objects in pictures, which makes it possible to improve the accuracy of boundary recognition of moving objects without difficulty in determining motion vectors.

It is still another object of the present invention to provide a method and apparatus for tracking moving objects in pictures, in which there is no need to use a special background picture.

In one aspect of the present invention, there is provided a method of tracking moving objects in time-series pictures with processing the pictures, each picture being divided into blocks, each block consisting of a plurality of pixels, wherein in a case where an identification code of moving object is assigned in a unit of block, and a motion vector of moving object is determined in a unit of block, the method comprising the step of:

(a) assigning the same identification code to adjacent blocks if an absolute value of a difference between motion vectors of the adjacent blocks is less than a predetermined value, thereby allowing different identification codes to be assigned to different moving objects overlapping in a picture.

According to this configuration, it is possible to track individual objects belonging to one cluster backward in time before the cluster is divided into the objects, which reduces the storage capacity of an image memory required to track moving objects backward in time, and also decreases the amount of image processing, thereby reducing the load on a CPU.

In another aspect of the present invention, there is provided a method of tracking moving objects in time-series pictures with processing the pictures, each picture being divided into blocks, each block consisting of a plurality of pixels, wherein an identification code of moving object is assigned in a unit of block, and a motion vector of moving object is determined in a unit of block, the method comprising the steps of, when a first block whose motion vector is not determined is present,:

(a) picking up determined motion vectors of blocks surrounding the first block;

(b) classifying the determined motion vectors into groups such that an absolute value of a difference between any two motion vectors in the same group is less than a predetermined value; and (c) estimating a motion vector of the first block to be approximately equal to an average of motion vectors belonging to one, having the largest number of motion vectors, of the classified groups.

According to this algorithm, motion vectors are reasonably estimated even if there are a large number of motion vectors that have not been determined. This makes it possible to divide a cluster into a plurality of objects on the basis of the estimated motion vectors.

In still another aspect of the present invention, there is provided a method of tracking moving objects in time-series pictures with processing the pictures, each picture being divided into blocks, each block consisting of a plurality of pixels, wherein in a case where an identification code of moving object is assigned in a unit of block, and a motion vector of moving object is determined in a unit of block, the method comprising the steps of:

(a) estimating a motion vector from a block-size region in a picture at a time t1 to a region of interest in a picture at a time t2 as MV, and estimating an identification code of the block of interest as ID;

(b) determining a correlation-related amount including an absolute value of a difference between the estimated motion vector MV of the block of interest and a motion vector of at least one, having an identification code equal to ID, of blocks surrounding the block of interest in the picture at the time t2; and (c) determining a value of an estimation function including the correlation-related amount for each first region moved within a predetermined range, and determining the motion vector MV and the identification code on the basis of an approximately-optimum value of the estimation function.

According to this method, even if the motion vector of a block of interest cannot be determined through the use of simple block matching because the amount of texture information of the block of interest is small, it is possible to reasonably determine the motion vector "MV" and the identification code "ID" of the block of interest at the same time.

Instead of the step (b), the method may comprise the step (b') of determining a correlation-related amount including an absolute value of a difference between the estimated motion vector "MV" of the block of interest and a motion vector of at least one block, having the same identification as the estimated identification "ID", within blocks surrounding a block "BLK" in the picture of the time "t1", to which the center of a region, obtained by moving the block of interest by −MV, belongs. In this case, the correlation-related amount of the step (c) is expressed by, for example, $\Sigma |MV-MV_{neighbor}|/L$, where $MV_{neighbor}$ denotes a motion vector of a block having the same identification code as ID of the block of interest, within blocks surrounding the block of interest, $\Sigma$ denotes a sum over the blocks having said same identification code ID, and L denotes a number of the blocks having said same identification code ID.

In another aspect of the present invention, there is provided a method of tracking moving objects in time-series pictures with processing the pictures, each picture being divided into blocks, each block consisting of a plurality of pixels, wherein in a case where an identification code of moving object is assigned in a unit of block, and a motion vector of moving object is determined in a unit of block, the method comprising the steps of:

estimating a motion vector from a block-size region in a picture at a time t1 to a region of interest in a picture at a time t2 as MV, and determining a similarity-related amount between an image of a first region, which is concentric with the block-size region and is larger than the block-size region, and an image of a second region, which is concentric with the block of interest and is in the same form as the first region; and determining a value of an estimation function including the similarity-related amount for each first region moved within a predetermined range, and determining the motion vector MV on the basis of an approximately optimum value of the estimation function.

According to this configuration, it is possible to improve the accuracy of boundary recognition of moving objects without difficulty in determining motion vectors with a reduced block size.

In still another aspect of the present invention, there is provided a method of tracking moving objects in time-series pictures with processing the pictures, the method comprising the steps of:

(a) dividing each picture into blocks, each block consisting of a plurality of pixels; and (b) with regarding a background image as a moving object, assigning an identification code of moving object in a unit of block and determining a motion vector of the moving object in a unit of block.

According to this configuration, it is possible to eliminate the need to use a special background picture, and also makes it possible to recognize the background picture even when the camera shakes.

In yet another aspect of the present invention, there is provided a method of tracking a moving object in time-series pictures with processing the pictures, each picture being divided into blocks, each block consisting of a plurality of pixels, wherein a plurality of object maps of different times have been stored, each object map having motion vectors of the moving object in a unit of block, the method comprising the steps of:

(a) determining a motion vector of a region of interest for one of the plurality of object maps; and (b) determining a motion vector of a region, to which the region of interest is moved with using the determined motion vector in positive or negative direction thereof, on the basis of an object map at a time corresponding to completion of the movement of the region, wherein the moved region is set as a region of interest on the object map of the time corresponding to the completion of the movement of the region, and the step (b) is repeated a plurality of times to track the region of interest.

According to this configuration, a portion (a region of interest) of a moving object unrelated to the boundaries between blocks can be tracked even if the picture is divided into blocks and the motion vector is determined for each block. Thereby, it is possible, for example, to analyze or classify the movement pattern of the region of interest or to determine that the movement pattern is a specific movement pattern. It is also possible to analyze or classify the movement pattern of the relative positions of a plurality of regions of interest or to determine that the movement pattern is a specific movement pattern.

Other aspects, objects, and the advantages of the present invention will become apparent from the following description.

PREFERRED EMBODIMENTS FOR IMPLEMENTING THE INVENTION

Figure 1:
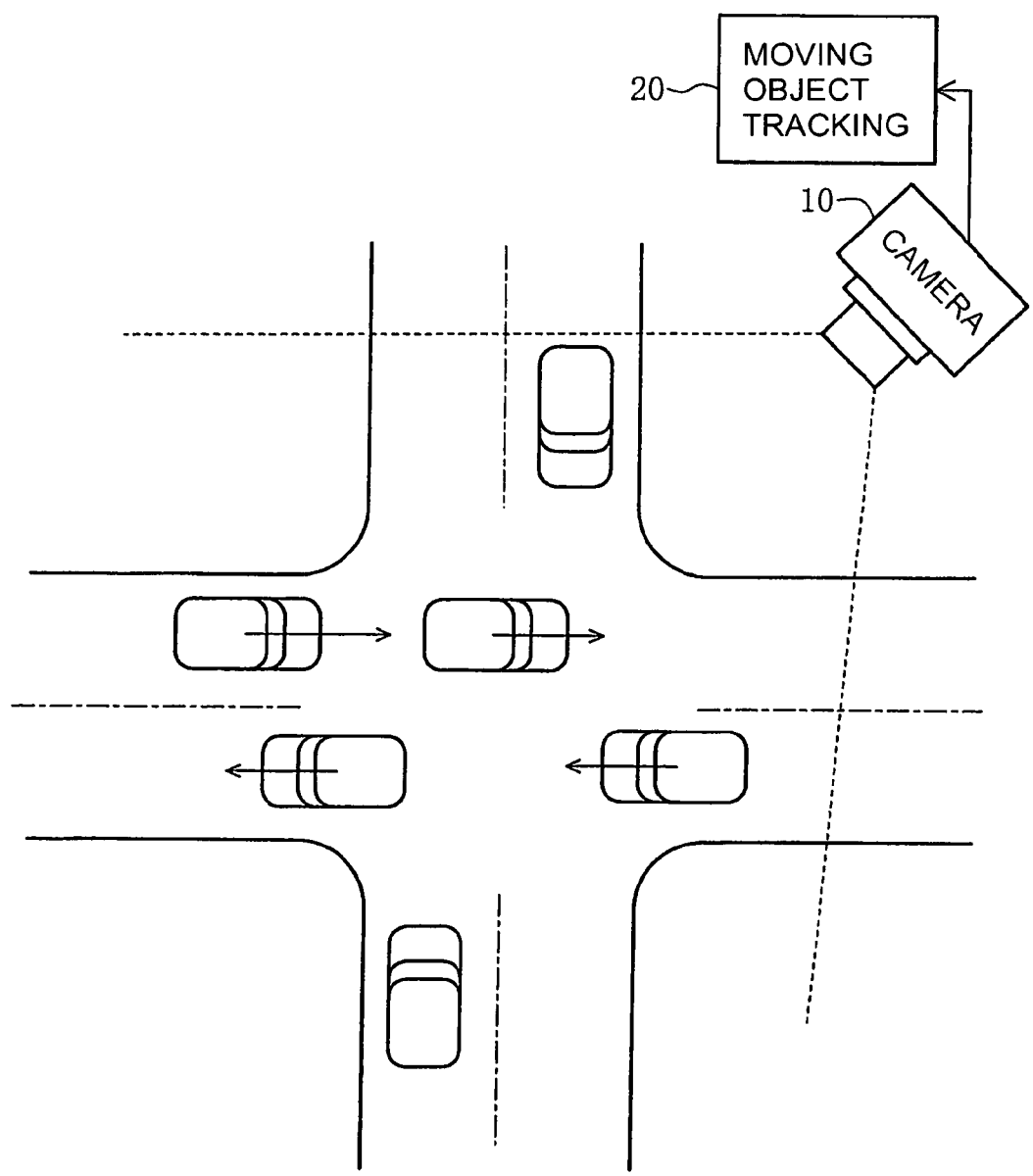
FIG. 1 is a schematic diagram illustrating an intersection and a moving object tracking apparatus according to a first embodiment of the present invention, which is placed at the intersection.

Referring now to the drawings, wherein like reference characters designate like or corresponding portions throughout several views, preferred embodiments of the present invention will be described.

First Embodiment

FIG. 1 is a schematic diagram showing an intersection and a moving object tracking apparatus according to a first embodiment of the present invention, which is placed at the intersection.

This apparatus includes an electronic camera 10 for capturing the intersection to output the captured picture signal, and a moving object tracking apparatus 20 for processing the captured pictures to track moving objects in the pictures.

Figure 2:
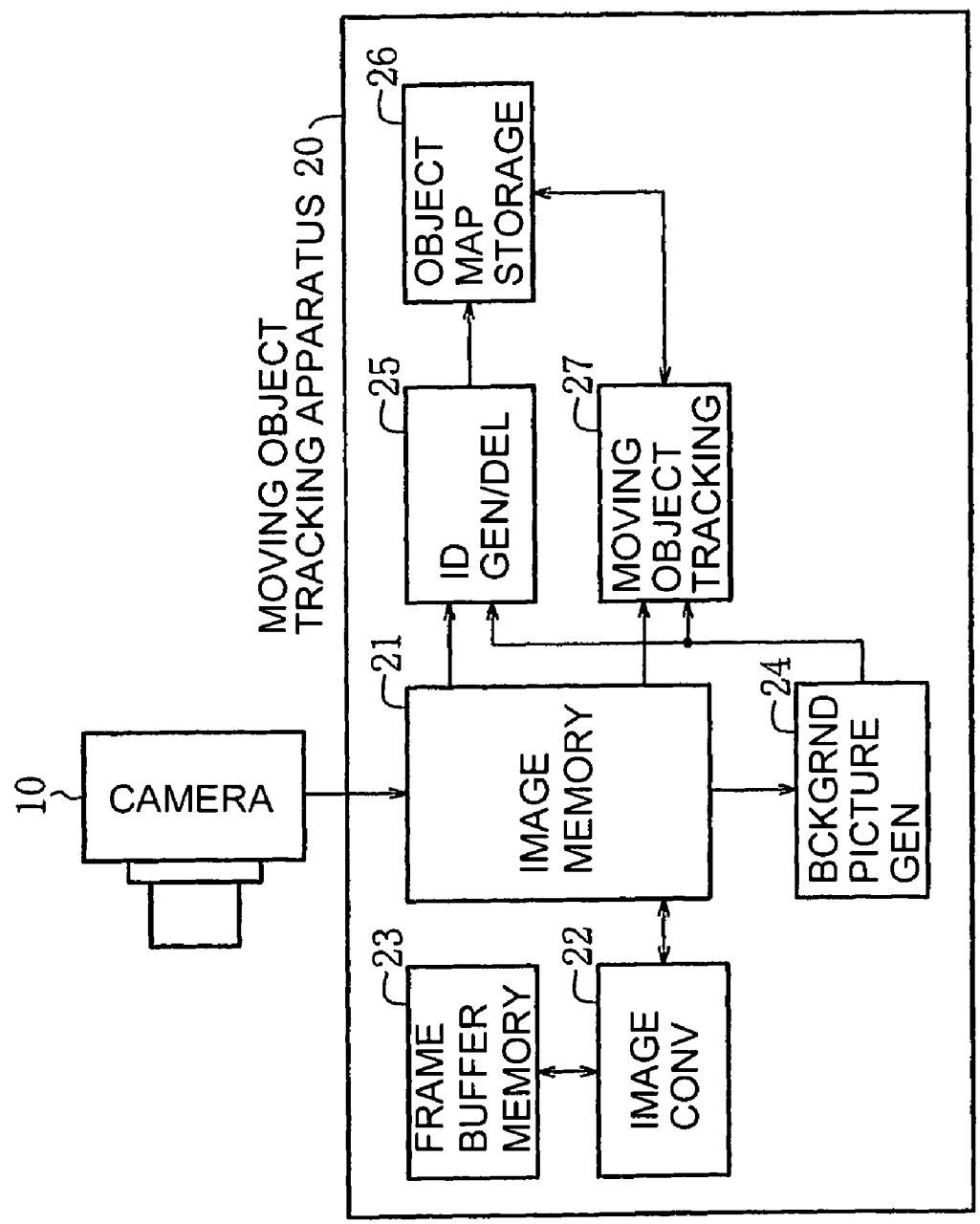
FIG. 2 is a functional block diagram of the moving object tracking apparatus of FIG. 1.

FIG. 2 is a functional block diagram of the moving object tracking apparatus 20. Elements of the moving object tracking apparatus 20, other than a memory thereof, can be implemented using computer software, a dedicated hardware, or a combination of both.

Time-series pictures shot by the electronic camera 10 are stored in an image memory 21 at a rate of, for example, 12 frames/sec, in which the oldest frame picture is replaced with a new frame picture.

An image converter 22 copies each of the frame pictures stored in the image memory 21 into a frame buffer memory 23, and uses the data of the copied frame picture to convert the corresponding frame picture in the image memory 21 to a spatial differential frame picture. This conversion has two steps.

Letting "G(i, j)" be a pixel value (brightness value) at the i-th row and j-th column of the original frame picture, then a pixel value H(i, j) at the i-th row and j-th column, which is obtained through the conversion in the first step, is expressed by the following equation.

$$H(i, j) = \Sigma_{neighborpixels} |G(i+di, j+dj) - G(i, j)| \quad (1)$$

where "$\Sigma_{neighborpixels}$" denotes a sum over di=−c to c and dj=−c to c with c being a natural number. For example, when c=1, "$\Sigma_{neighborpixels}$" denotes a sum over 8 pixels neighboring to a pixel at the i-th row and j-th column. If the luminance varies, a pixel value G(i, j) and pixel values "G(i+di, j+dj)" in the neighborhood vary in like way. Therefore, the pixel value H(i, j) is not affected by variations in the luminance.

Generally, the larger the pixel value, the larger the absolute value of the difference between the pixel value and its neighboring pixel value. In order to increase the success rate of tracking moving objects, even if the pixel value is small and thus the difference is small, it is desired to obtain edge information almost equivalent to edge information obtained when the pixel value is large and thus the difference is large. Thus, the pixel value H(i, j) is normalized as follows:

$$H(i, j) = \Sigma_{neighborpixels} |G(i+di, j+dj) - G(i, j)| / (G_{i,j,max} / G_{max}) \quad (2)$$

where "$G_{i,j,max}$" denotes the maximum of the original pixel values used in the calculation of H(i, j). For example, when c=1, the value "$G_{i,j,max}$" is the maximum of the pixel values of 3×3 neighboring pixels including the pixel of the i-th row and j-th column at the center. "$G_{max}$" denotes the maximum allowable value of the pixel value G(i, j). For example, when the pixel value is expressed in 8 bits, the value "$G_{max}$" is equal to 255. In the following description, it is assumed that c=1 and $G_{max}$=255.

The maximum allowable value of H(i, j) varies depending on moving objects. For example, if G(i, j)=$G_{max}$ and all the 8 neighboring pixels have a pixel value of "0", then H(i, j)=8 $G_{max}$ and H(i, j) cannot be expressed in 8 bits.

On the other hand, histograms of the values of H(i, j) for the edge portions of moving objects have showed that most values of H in the edge portions are in the range of 50 to 110. That is, as the value of H is larger than about 110, the amount of edge information for the tracking of moving object is smaller, and thus it becomes less important.

Accordingly, it is desired to suppress portions having a high value of H in order to reduce the bit length of the converted pixel value and thereby attain a high image processing speed. Thus, in the second stage, it is performed to convert the pixel value "H(i, j)" to a pixel value "I(i, j)" with the following equation having a sigmoid function.

$$I=G_{max}/\{1+\exp(-\beta(H-\alpha))\} \quad (3)$$

The sigmoid function has a good linearity for values of H around α. Therefore, the value α is set to the most frequent value (for example, 80) in the frequency distribution of the values of H that has edge information.

The image converter 22 converts, on the basis of the above equations (2) and (3), pictures having pixel values G(i, j) to spatial differential frame pictures having pixel values I(i, j), which are then stored in the image memory 21.

A background picture generator 24, an ID generation/deletion section 25, and a moving object tracking section 27 perform processing on the basis of the spatial differential frame pictures stored in the image memory 21. Hereinafter, the spatial differential frame picture is simply referred to as a frame picture.

The background picture generator 24 includes storage and processing sections. Regarding all the pictures captured for the past 10 minutes, for example, the processing section accesses the image memory 21 to produce a histogram of the pixel values of a corresponding pixel position for each pixel position, defines a picture, each pixel value of which is equal to the most frequent pixel value (i.e., mode) of the corresponding histogram, as a background picture with no moving object therein, and then stores the background picture in the storage section. This processing is repeated periodically to update the background picture.

Figure 3:
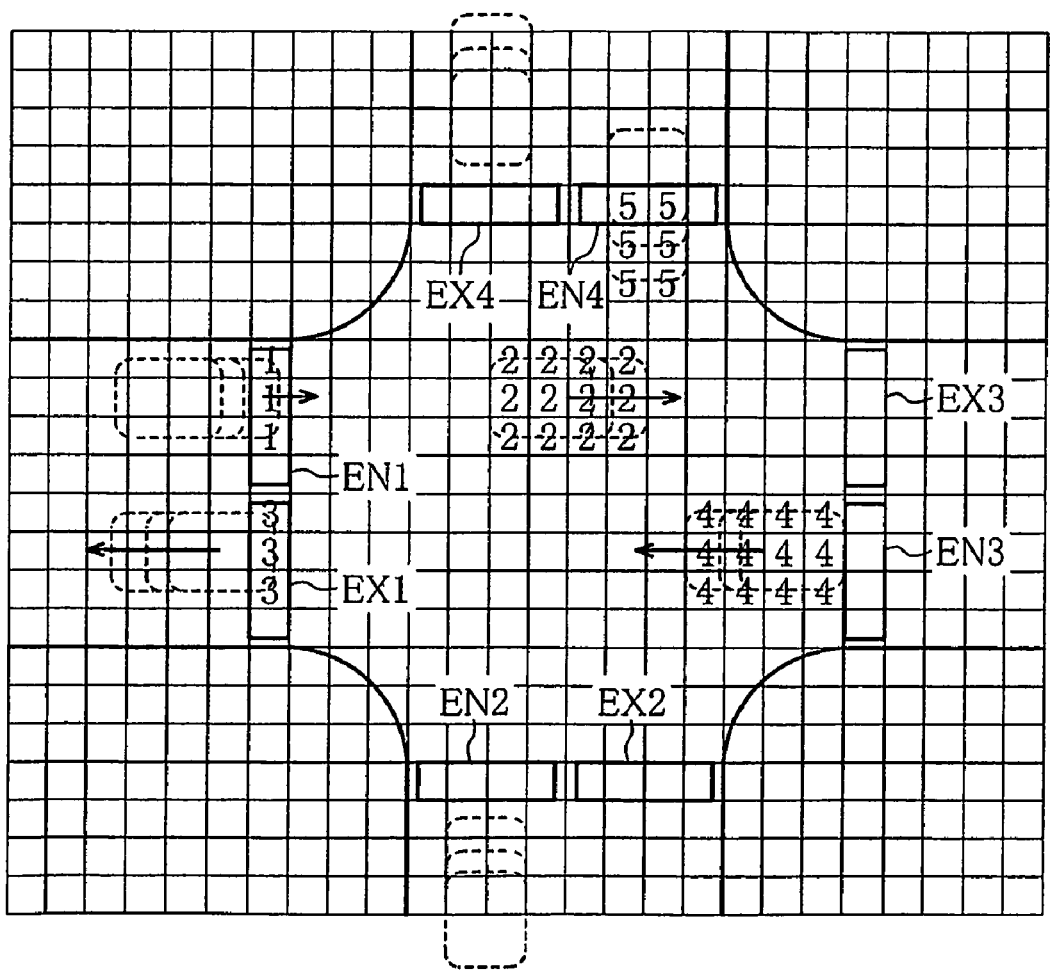
FIG. 3 is a schematic diagram illustrating slits defined at four entrances and four exits of the intersection and IDs of moving objects assigned to blocks, in a frame picture.
Figure 4:
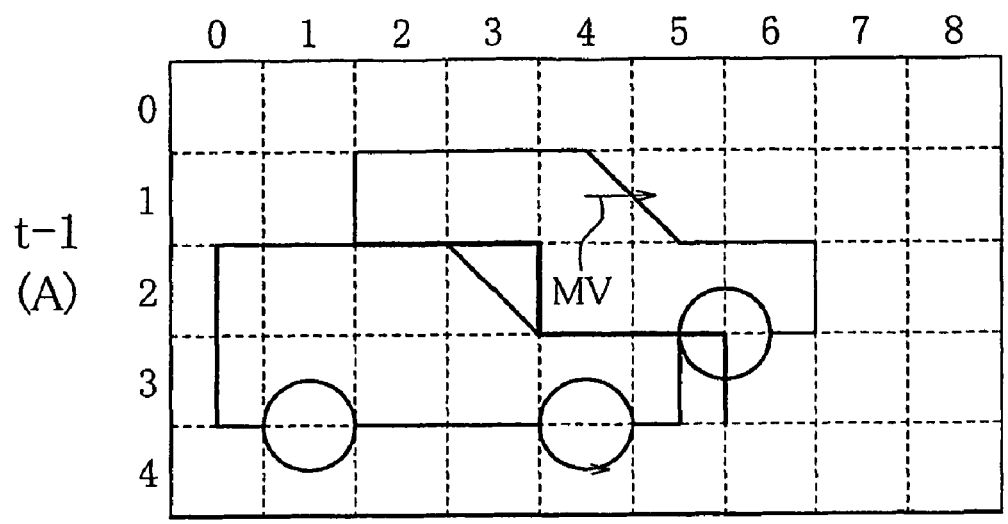
FIGS. 4(A) and 4(B) are schematic diagrams illustrating a picture at time (t−1) and a picture at time t, respectively, with block boundary lines.
Figure 4:
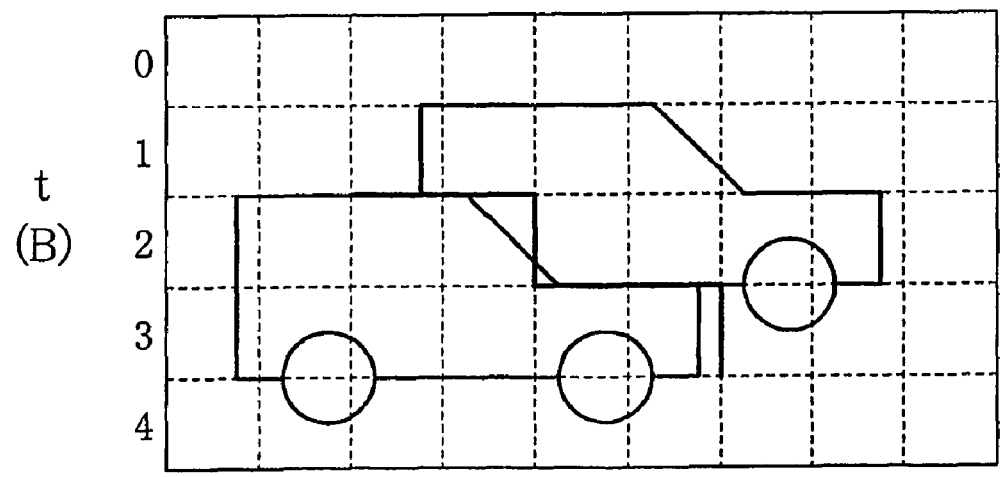

As shown in FIG. 3, in the ID generation/deletion section 25, there are set the data of positions and sizes of slits EN1 to EN4 disposed at 4 entrances of the intersection in a frame picture and the data of positions and sizes of slits EX1 to EX4 disposed at 4 exits of the intersection. The ID generation/deletion section 25 reads data of images inside the entrance slits EN1 to EN4 from the image memory 21 to determine whether or not a moving object exists in each block in each entrance slit. Squares in meshes of FIG. 3 represent respective blocks, each block has a size of, for example, 8×8 pixels, and one frame is divided into 60×80 blocks if one frame is composed of 480×640 pixels. Whether or not a moving object exists in a block is determined on the basis of whether or not the sum of the absolute values, each of which is a difference between a pixel values in the block and a pixel value of the corresponding pixel of the background picture, is greater than a predetermined value. The determination is performed also in the moving object tracking section 27.

The ID generation/deletion section 25 assigns a new object identification (ID) to a block when it is determined that a moving object exists in the block. When it is determined that a moving object exists in a block adjacent to another block to which an ID has been assigned, the ID generation/deletion section 25 assigns the same ID as that of the assigned adjacent block. This block to which an ID has been assigned may be one adjacent to an entrance slit. For example in FIG. 3, an ID of "1" is assigned to each block in the entrance slit EN1.

The ID assignment is performed for corresponding blocks in an object map storage section 26. In the above example, the object map storage section 26 stores an object map having 60×80 blocks. For each block, provided is the block information including; a flag indicating whether or not an ID has been assigned to the block; and an ID number and a block motion vector described later when the ID has been assigned. An ID value of "0" may be used to indicate that no ID has been assigned, without using the flag. Further, the most significant bit of an ID may be used as the flag.

For a cluster having passed an entrance slit, the moving object tracking section 27 performs tracking with assigning the same ID to blocks in the moving direction side and deleting the ID of blocks in the reverse moving direction side. The moving object tracking section 27 performs this tracking for each cluster until inside an exit slit.

The ID generation/deletion section 25 further checks whether or not an ID is assigned to any block in the exit slits EX1 to EX4 on the basis of information in the object map storage section 26, and if an ID has been assigned to blocks in an exit slit, the ID generation/deletion section 25 deletes the ID assigned to the blocks when the cluster having the ID has passed through the exit slit. For example in FIG. 3, when a transition is made from a state where an ID of "3" is assigned to blocks in the exit slit EX1 to a state where no ID is assigned thereto, the ID "3" is deleted. The deleted ID can be used as the next ID to be generated.

The moving object tracking section 27 generates an object map at time t in the storage section 26 on the basis of an object map at time (t−1) stored in the object map storage section 26, and frame pictures at time (t−1) and time t which are stored in the image memory 21. This procedure will now be described.

Figure 5:
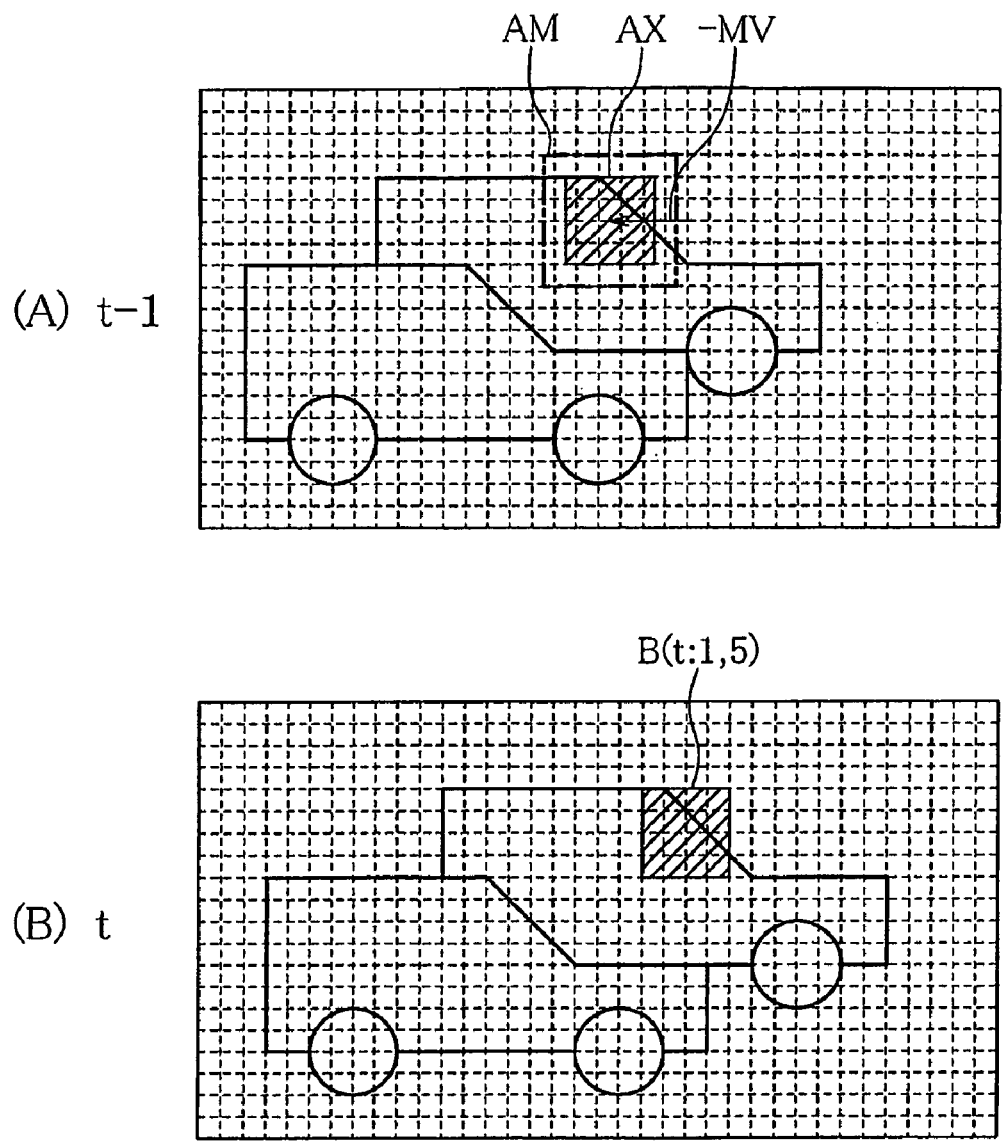
FIGS. 5(A) and 5(B) are schematic diagrams illustrating a picture at time (t−1) and a picture at time t, respectively, with pixel boundary lines.

Each of FIGS. 4 to 7 illustrate a picture at time (t−1) and a picture at time t. Dotted lines in FIGS. 4, 6 and 7 denote boundary lines between blocks, and dotted lines in FIG. 5 are boundary lines between pixels.

"B(i, j)" denotes a block at the i-th row and j-th column, and "B(t: i, j)" denotes a block at the i-th row and j-th column at time t. Assume that a motion vector of a block B(t−1: 1, 4) is "MV" let us find a block at time t that best corresponds to a region to which the block B(t−1: 1, 4) is moved by the motion vector "MV". This block at time t is "B(t: 1, 5)" in the case of FIG. 4(B). As shown in FIG. 5, the correlation between an image of the block B(t: 1, 5) and an image of a block-size region AX at time (t−1) is calculated for every block-size region AX moved pixel-by-pixel within a predetermined range AM (block matching).

The range AM is set to be larger than the block size, and for example, one side of the range AM is 1.5 times larger than the number of pixels of corresponding one side of the block. The center of the range AM is a pixel located at a position to which the center of the block B(t: 1, 5) is moved by approximately −MV.

The correlation is, for example, a space-time texture correlation. Assume that this correlation increases as an evaluation value UD, which is the sum of the absolute values of the differences between pixel values of the block B(t: 1, 5) and corresponding pixel values of the region AX, decreases.

A region AX in the range AM, which provides the largest correlation, is obtained, and a vector starting at the center thereof and ending at the center of the block B(1, 5) is determined to be a motion vector of the block B(t: 1, 5). The same ID of a block at time (t−1) nearest to the largest-correlation region AX is assigned as that of the block B(t: 1, 5).

Figure 6:
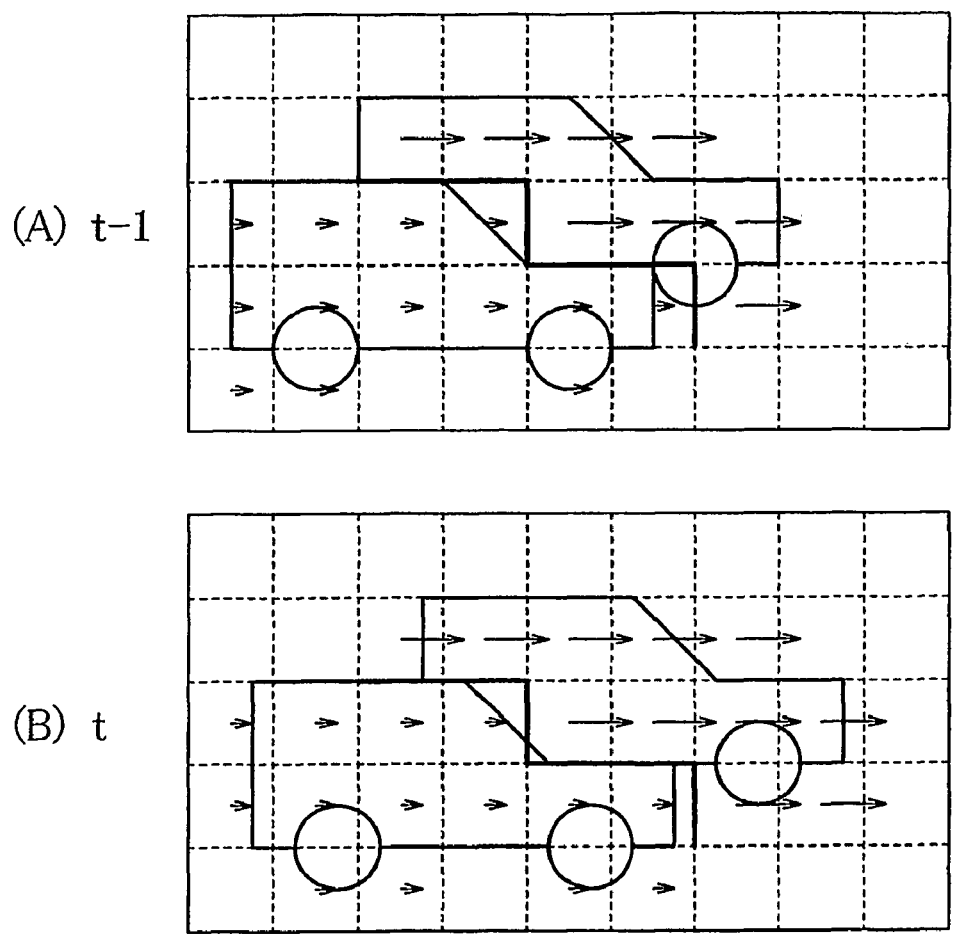
FIGS. 6(A) and 6(B) are schematic diagrams illustrating a picture at time (t−1) and a picture at time t, respectively, with motion vectors assigned to blocks.

The moving object tracking section 27 assigns the same ID to adjacent blocks if the absolute value of the difference between motion vectors of the adjacent blocks are less than a predetermined value. This allows a cluster to be divided into a plurality of objects (moving objects) having different IDs. In FIG. 6, a bold line indicates the boundary between objects.

Figure 7:
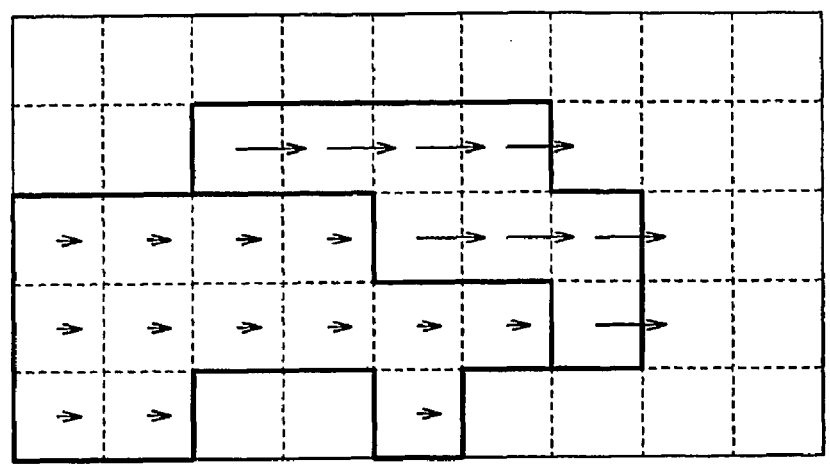
FIGS. 7(A) and 7(B) are schematic diagrams illustrating an object map at time (t−1) and an object map at time t, respectively, with motion vectors and object boundaries.
Figure 7:
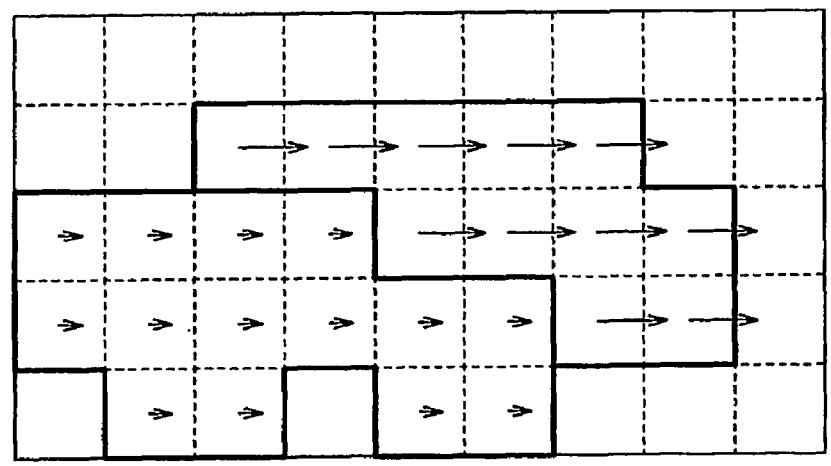

Although images of moving objects are not present on the object map, the moving objects are schematically drawn on the object map in FIG. 6 for better understanding. FIG. 7, which corresponds to FIG. 6, illustrates a object map in which boundaries of the objects are shown by bold lines.

For example, assume that after one cluster is detected at the entrance slit EN1 of FIG. 3, which is not divided into a plurality of objects, the cluster is divided into a plurality of objects at time t1 in the same manner as described above. In this case, the cluster is divided into a plurality of objects in object maps at times previous to the time t1 by obtaining object maps with reverse tracking in time from time t1 in the same manner as forward tracking in time. Thereby it is possible to divide and recognize objects, which cannot be divided, and thus to track the objects individually.

Figure 28:
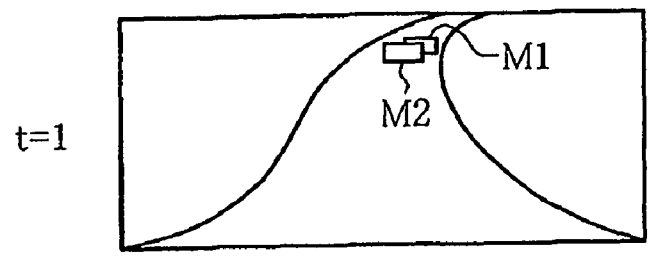
FIG. 28 is a schematic diagram illustrating time-series pictures captured by a camera disposed above a halfway line of an expressway.
Figure 28:
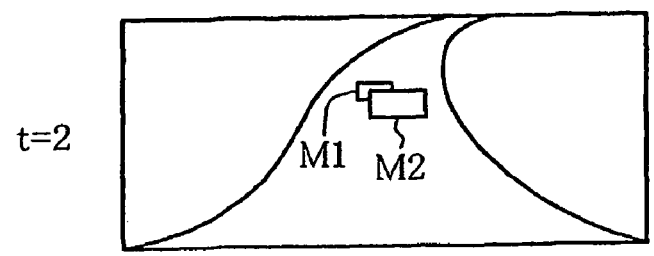
Figure 28:
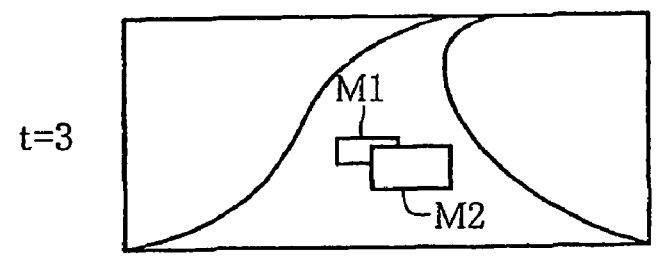
Figure 28:
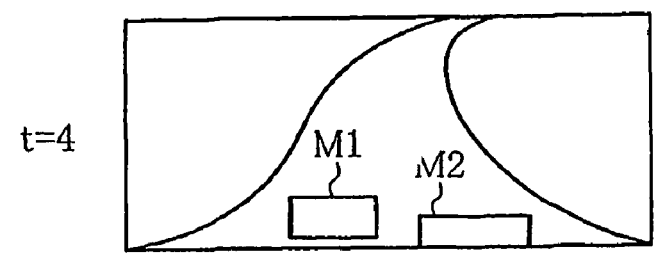

In the above Japanese Patent Application Publication No. 2002-133421, individual objects are traced backward in time after one cluster is divided into a plurality of objects. However, in this embodiment, before one cluster is divided into a plurality of objects, individual objects can be traced backward in time from, for example, time t=2 which is previous to time t=4 of FIG. 28. This reduces the required storage capacity of the image memory 21, and also decreases the amount of image processing, thereby reducing the load on the CPU.

Figure 9:
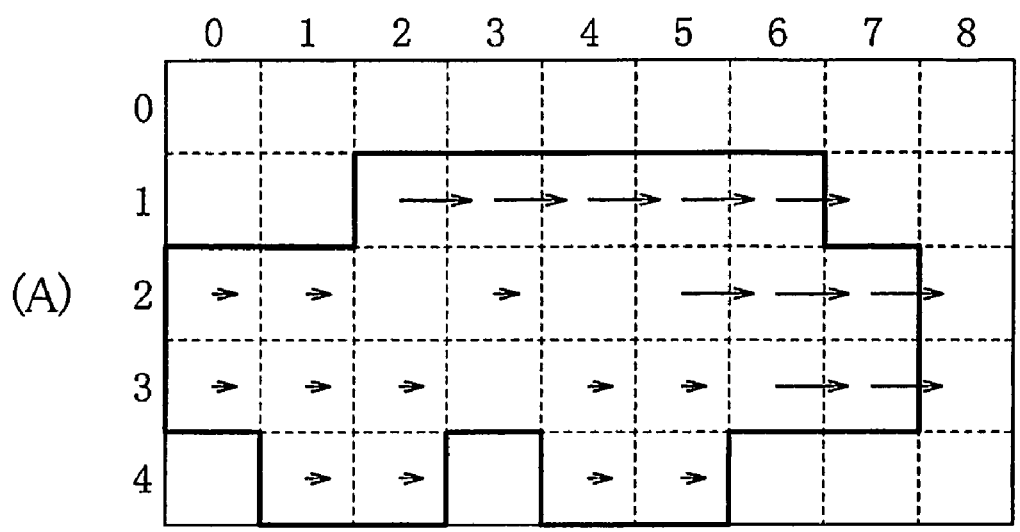
FIGS. 9(A) and 9(B) are schematic diagrams illustrating object maps for explaining the procedure of FIG. 8, with motion vectors and object boundaries.
Figure 9:
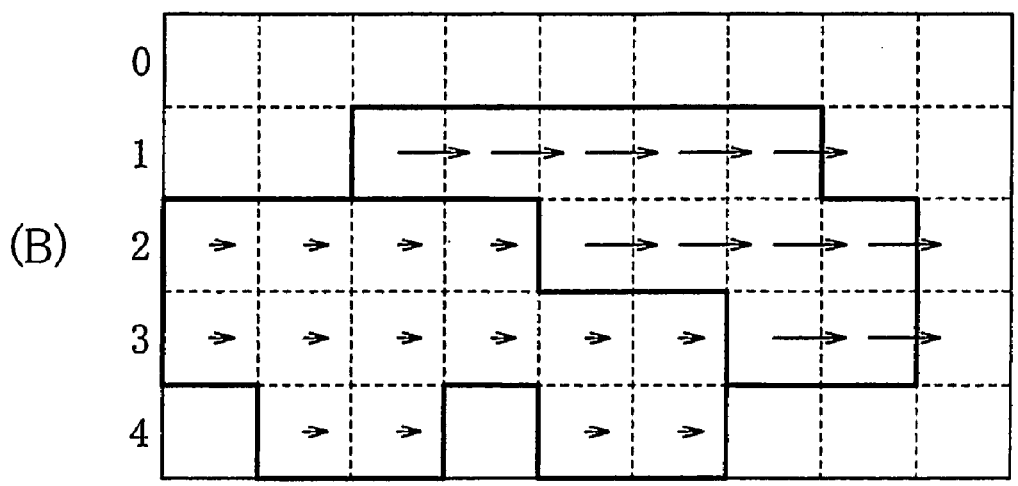

The above description has been given for the case where the motion vectors of the blocks in a cluster can be determined. However, if there are blocks whose motion vectors are not determined as shown in FIG. 9(A), there is a location of a block in which it is not obvious which object the block belongs to. If the pixels in a block belonging to a certain moving object have almost the same color, it is not possible to determine the motion vector of the block through the use of the above block matching. For example, a picture (a spatial differential frame picture) is converted into a binary picture, and if the number of pixels having a pixel value "1" in a block is less than a predetermined value, the block is determined to be a block unsuitable for determining the motion vector through the use of the above method.

Figure 8:
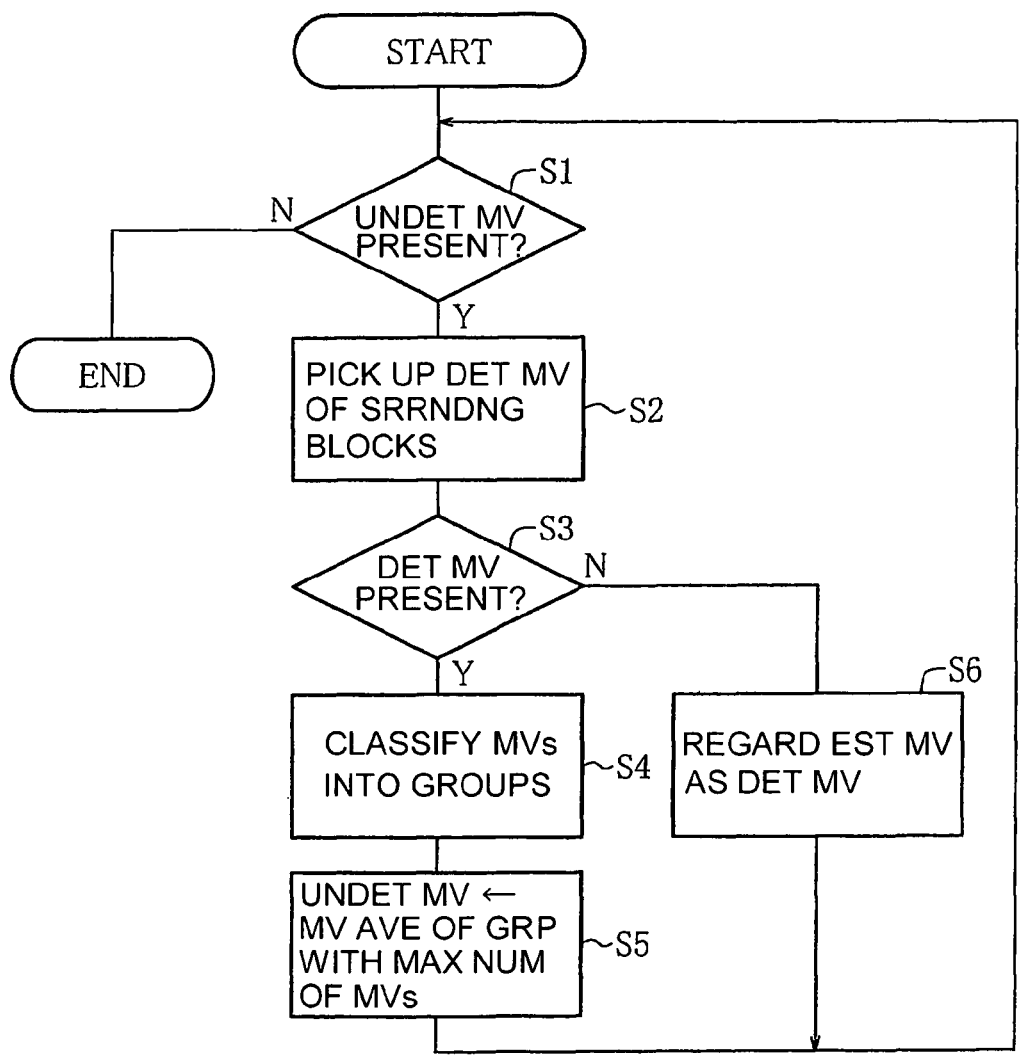
FIG. 8 is a flow chart showing a method of estimating motion vectors which have not been determined.

The motion vector of such a block is estimated in a method illustrated in FIG. 8.

(S1) If there is a block B(i, j) whose motion vector has not been determined, then the procedure goes to step S2, else the procedure for estimating motion vectors which have not been determined is terminated.

(S2) Determined motion vectors MV1 to MVn of blocks from among 8 blocks surrounding the block B(i, j), whose motion vector is not determined, are picked up.

(S3) If any determined motion vector is present at step S2, then the procedure goes to step S4, else it goes to step S6.

(S4) The determined motion vectors MV1 to MVn are classified into groups of motion vectors such that the absolute value of a difference between any two motion vectors in the same group is less than a predetermined value.

(S5) The motion vector of the B(i, j) is estimated to be equal to the average of the motion vectors of one of the classified groups, which has the largest number of motion vectors. If there are a plurality of groups having the largest number of motion vectors, the motion vector of the B(i, j) is estimated to be equal to the average of the motion vectors of any one of the plurality of groups. Then the procedure returns to step S1.

Note that since motion vectors of the same group are approximately equal to each other, the motion vector of the B(i, j) may also be estimated to be equal to any one of the motion vectors of the same group.

(S6) The motion vectors estimated at step S5 are regarded as determined motion vectors. Then, the procedure returns to step S1.

Motion vectors which have not been determined, can be estimated uniquely in this manner.

Next, examples will be explained. In FIG. 9(A), a motion vector of a block B(i, j) at the i-th row and j-th column is denoted by MV(i, j). In FIG. 9(A), motion vectors of blocks B(2, 2), B(2, 4) and B(3, 3) are undetermined. Motion vectors of blocks surrounding the block B(2, 2) are divided into a group of motion vectors MV(2, 1), MV(3, 1), MV(3, 2) and MV(2, 3), and a group of motion vectors MV(1,2) and MV(1, 3). Therefore, the former group is selected, and estimation is performed as $$MV(2, 2) = (MV(2, 1) + MV(3, 1) + MV(3, 2) + MV(2, 3))/4.$$

Motion vectors of blocks surrounding the block B(2, 4) are divided into a group of motion vectors MV(2, 3), MV(3, 4), and MV(3, 5), and a group of motion vectors (1, 3), MV(1, 4), MV(1, 5) and (2, 5). Therefore, the latter group is selected, and estimation is performed as $$MV(2, 4) = (MV(1, 3) + MV(1, 4) + MV(1, 5) + MV(2, 5))/4.$$

Motion vectors of blocks surrounding the block B(3, 3) constitute one group of motion vectors MV(2, 3), MV(3, 2), MV(4, 2), MV(4, 4), and MV(3, 4). Therefore, the motion vector MV(3, 3) of the block B(3, 3) is estimated as $$MV(3, 3) = (MV(2, 3) + MV(3, 2) + MV(4, 2) + MV(4, 4) + MV(3, 4))/5.$$

In this manner, an object map as shown in FIG. 9(B) is made. In FIG. 9(B), the boundaries of the objects are indicated by bold lines.

Figure 10:
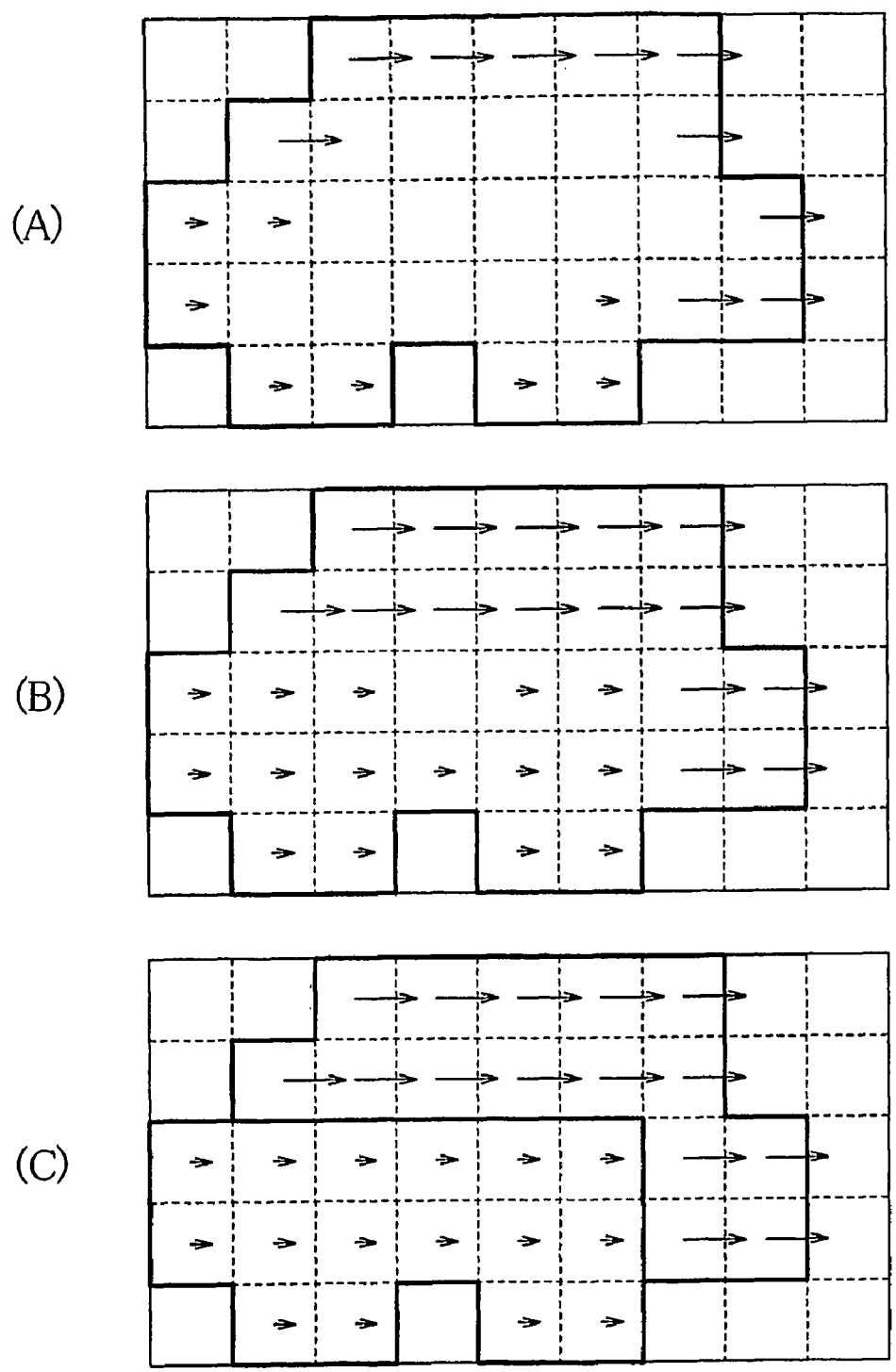
FIGS. 10(A) to 10(C) are schematic diagrams illustrating object maps for explaining the procedure of FIG. 8, with motion vectors and object boundaries.

Even when there are a large number of undetermined motion vectors as shown in FIG. 10(A), the motion vectors can be estimated uniquely as shown in FIG. 10(B) by repeating steps S1 to S5 until the determination of step S3 is negative. Then, the estimated motion vectors are regarded as determined motion vectors at step S6, and then steps S1 to S5 are performed once again, so that the motion vector of the block B(3, 4) is uniquely estimated as shown in FIG. 10(C). Then, the same ID is assigned to any adjacent blocks if the absolute value of the difference between the adjacent motion vectors is less than a predetermined value. This allows one cluster to be divided into a plurality of objects having different IDs.

Note that the moving object tracking section 27 stores the time-series object maps stored in the object map storage section 26, as a tracking result, in a hard disk not shown.

Second Embodiment

In the first embodiment, the unknown motion vector of a block is estimated on the basis only of motion vectors of blocks surrounding the block, so that the accuracy of estimation of the ID and motion vector of the block is reduced if there are a large number of undetermined motion vectors.

To increase the accuracy, the second embodiment of the present invention determines the IDs and motion vectors of all blocks at the same time, on the basis of values of an estimation function, which is described below. In the second embodiment, in the same manner as in the first embodiment, the moving object tracking section 27 of FIG. 2 makes and stores an object map at time t in the object map storage section 26, on the basis of both an object map at time (t−1) stored in the object map storage section 26 and frame pictures at times (t−1) and t stored in the image memory 21.

Firstly, a description will be given of an estimation function U(i, j) of any block B(t: i, j) including a portion of a moving object. The estimation function U(i, j) is expressed as a linear combination of four sub-estimation functions as follows.

$$U(i, j) = aUD + bUM + cUN + fUV \qquad (1)$$

Here, "a", "b", "c" and "f" are constants, which are determined by trial and error.

In the following description, one block is assumed to be composed of m×m pixels, "G(t: g, h)" denotes a pixel value of a pixel at the g-th row and h-th column at time t, and "(MVX, MVY)" denotes an estimated motion vector MV of a block B(t: i, j). It is also assumed that i≧0, and j≧0.

(1) Sub-Estimation Function UD Representing Time-Space Texture Correlation

The sub-estimation function UD represents a time-space texture correlation, which is the same as described in the first embodiment and is expressed by the following equation.

$$UD(i, j, MV) = \Sigma |G(t: mi+x, mj+y) - G(t-1: mi+x-MVX, mj+y-MVY)| \qquad (2)$$

where "Σ" denotes a sum over x=0 to m−1 and y=0 to m−1.

Figure 12:
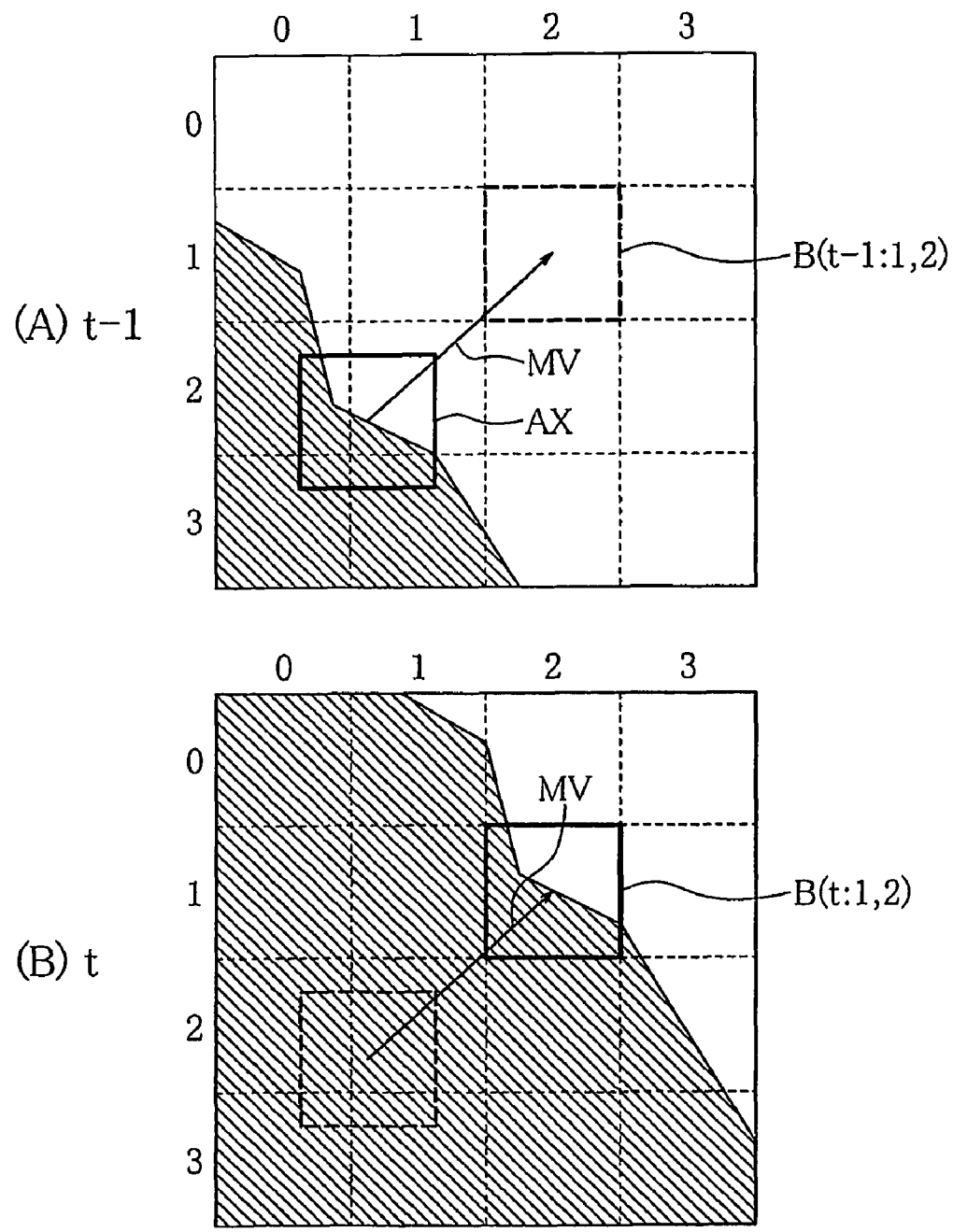
FIGS. 12(A) and 12(B) are schematic diagrams for illustrating space-time texture correlation.

In FIG. 12, doted lines denote boundaries between blocks, and a hatched portion indicates a moving object. FIG. 12(B) shows an estimated motion vector "MV" of a block of interest B(t: 1, 2), and FIG. 12(A) shows a region "AX" to which a block B(t: 1, 2) is moved by −MV. In this case, an estimation function UD(1, 2, MV) of an image of the block B(t: 1, 2) and an image of the region AX is calculated. If MV is changed, the value of UD is also changed, and the smaller the value of UD, the larger the texture correlation between the image of the block B(t: 1, 2) and the image of the region AX. A motion vector MV, which provides the smallest value of UD, is the most probable motion vector. Since there are limitations on the speed of moving objects, the minimum value of UD is calculated with moving the region AX pixel-by-pixel within a specific range from the center of the block of interest B(t: 1, 2), for example, within a range of ±25 pixels in the vertical direction and ±25 pixels in the horizontal direction. This specific range may also be a range "AM" estimated with using the motion vector at time (t−1) as described above in the first embodiment.

(2) Sub-Estimation Function UM Representing Time-Space ID Correlation

Figure 13:
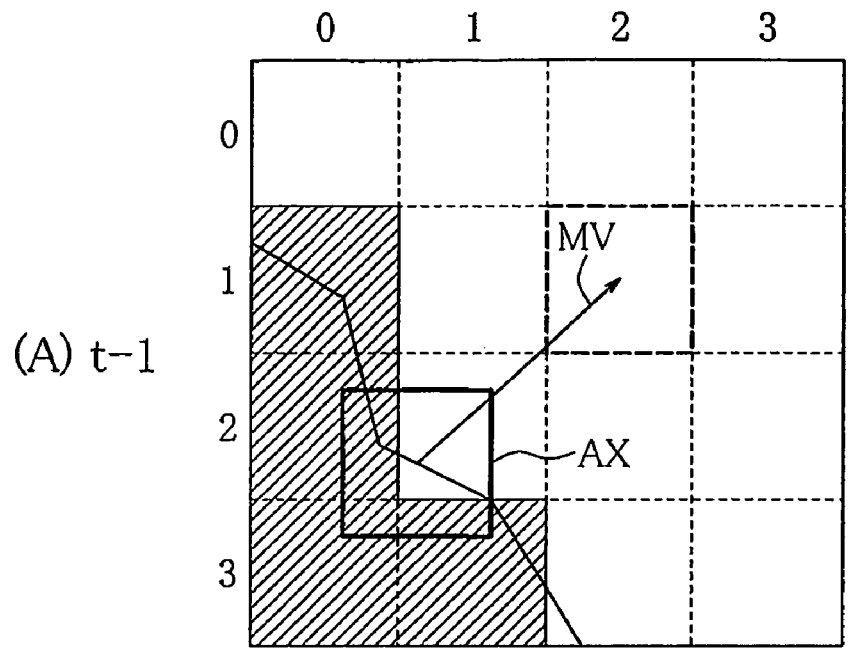
FIGS. 13(A) and 13(B) are schematic diagrams for illustrating spatial ID correlation.
Figure 13:
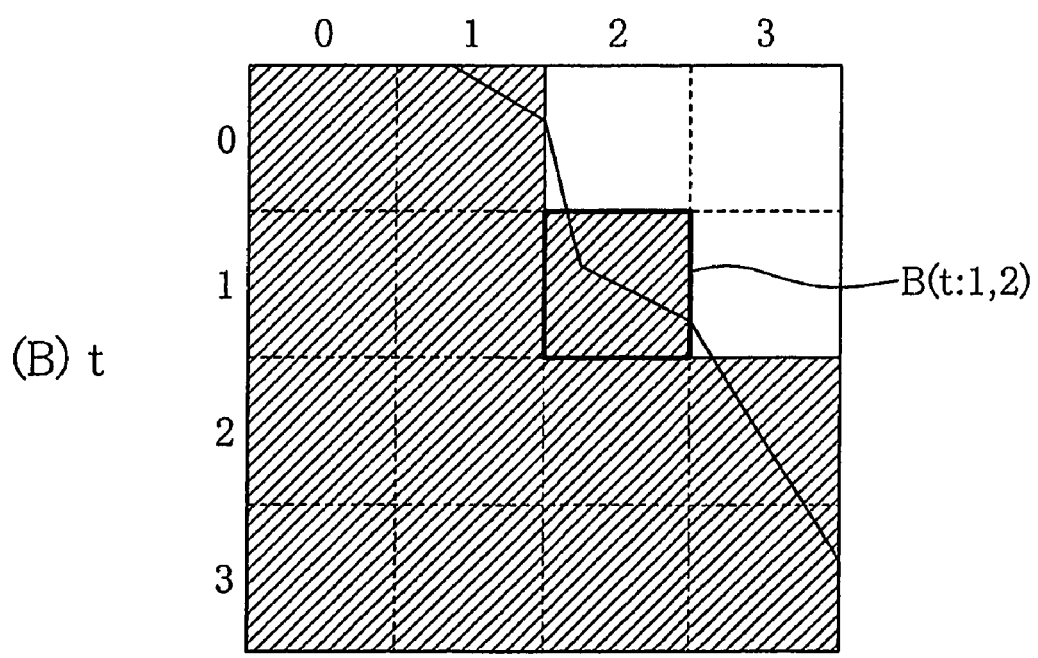

FIGS. 13(A) and 13(B) correspond to FIGS. 12(A) and 12(B), respectively, and hatched portions therein indicate blocks estimated that a moving object is present.

When the ID of the block of interest B(t: 1, 2) is estimated to be "ID1", let "M" be the number of pixels of ID="ID1" included in the region AX. In the case of FIG. 13(A), the number of pixels of the hatched portion inside the region is "M". However, the value "M" is zero if the estimated ID of the block of interest B(t: 1, 2) quite differs from IDs inside the region AX. The maximum value of M is m².

The sub-estimation function UM indicates a space-time ID correlation and is expressed by the following equation.

$$UM(i, j, MV) = (M - m^2)^2 \qquad (3)$$

The smaller the value of UM, the larger the space time ID correlation.

It is possible to determine the ID and MV of the block of interest B(t: i, j) at the same time by obtaining the minimum value of "aUD+bUM" with moving the region AX pixel-by-pixel within the predetermined range from the center of the block of interest B(t: i, j).

(3) Sub-Estimation Function UN Representing Spatial ID Correlation

In FIG. 13(B), when the ID of the block of interest B(t: 1, 2) is estimated to be "ID1", let "N" be the number of blocks with ID being equal to "ID1" within 8 blocks which surround the block of interest, i.e., B(t: 0, 1), B(t: 0, 2), B(t: 0, 3), B(t: 1, 3), B(t: 2, 3), B(t: 2, 2), B(t: 2, 1), and B(t: 1, 1). If all the blocks of the hatched portion of the FIG. 13(B) have the same ID, the value "N" of the block of interest B(t: 1, 2) is 5.

The sub-estimation function UN indicates a spatial ID correlation and is expressed by the following equation.

$$UN(i, j) = (N - 8)^2 \qquad (4)$$

The smaller the value of UN, the larger the spatial ID correlation.

(4) Sub-Estimation Function UV Representing Spatial MV Correlation

It is possible to determine the ID and MV of the block of interest B(t: i, j) at the same time by obtaining the minimum value of "aUD+bUM+cUN" with moving the region AX pixel-by-pixel within the predetermined range from the center of the block of interest B(t: i, j).

However, if a plurality of regions, which are obtained by moving the region AX, have the same texture as the block of interest, the motion vector MV cannot be determined. This motion vector MV can be estimated to be almost the same as the motion vector MV of a block which is near the block of interest and also has the same ID as the block of interest. Therefore, a sub-estimation function UV, which indicates a spatial MV correlation, is defined as follows.

$$UV(i, j) = |MV - MV_{neighbor}|/L \qquad (5)$$

Here, "MV" denotes the estimated motion vector of the block of interest B(t: i, j) described above item (1), "$MV_{neighbor}$" denotes motion vectors of blocks having the same ID as the estimated ID of the block of interest B(t: i, j), within 8 blocks surrounding the block of interest B(t: i, j), "Σ" denotes a sum over blocks having the same ID, and "L" denotes the number of blocks having the same ID.

Figure 14:
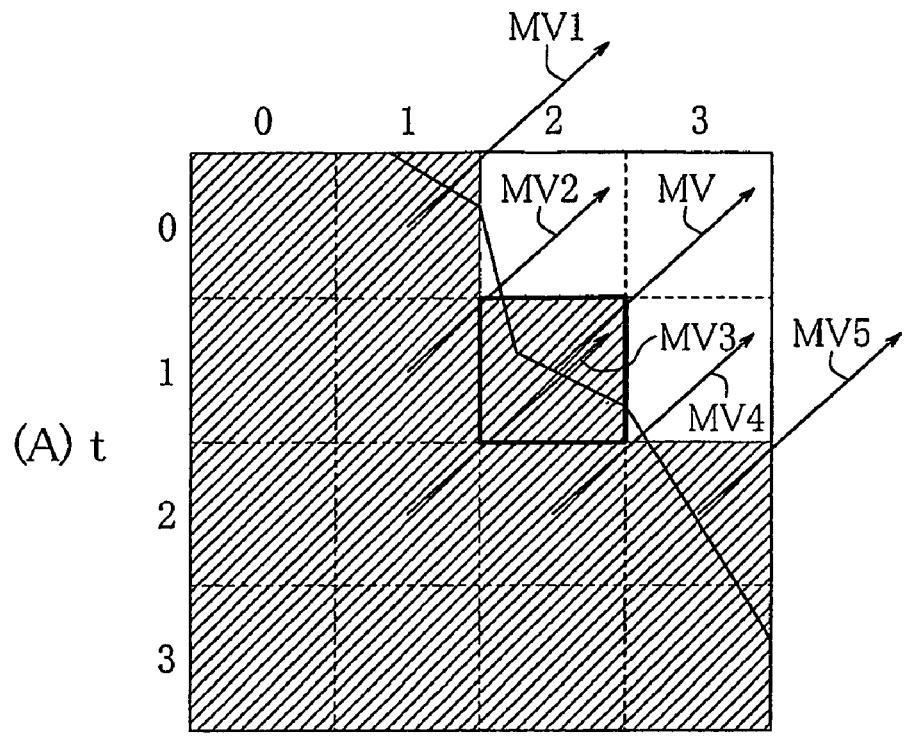
FIGS. 14(A) and 14(B) are schematic diagrams for illustrating spatial motion vector correlation.
Figure 14:
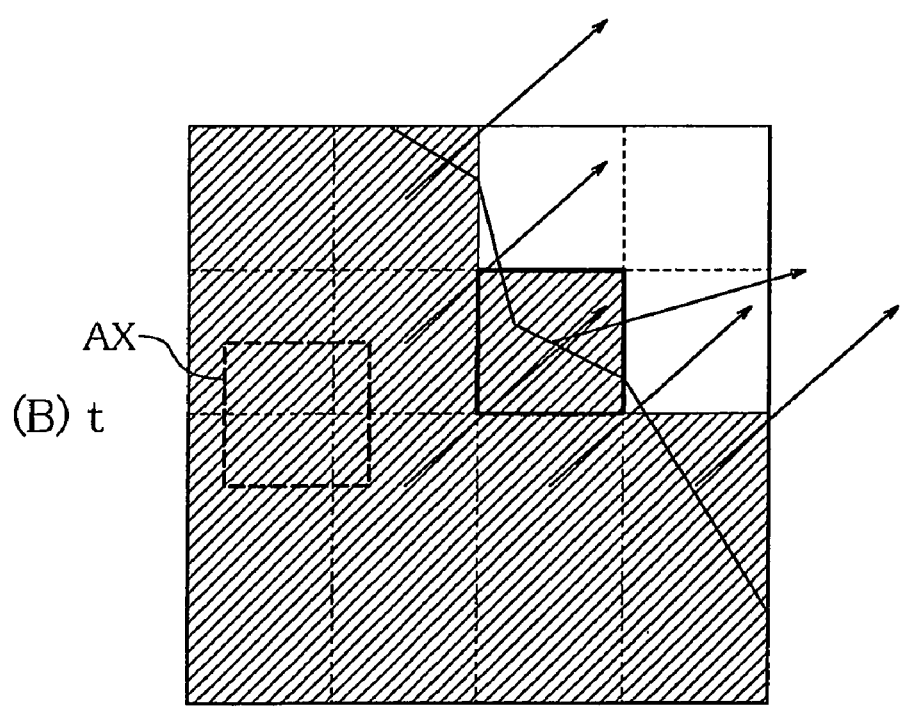

In the case of FIG. 14(A), assuming that the hatched blocks have the same ID, the following holds.

$$UV(1, 2) = (|MV - MV1| + |MV - MV2| + |MV - MV3| + |MV - MV4| + |MV - MV5|)/5$$

If the region AX at time (t−1) is as shown in FIG. 14(B), the value of UV(1, 2) is large, so that the reliability of the estimated motion vector MV is low. The smaller the value of UV, the larger the spatial MV correlation.

It is possible to determine the ID and MV of the block of interest B(t: i, j) at the same time by minimizing the minimum value of the estimation function U of the above Equation (1) with moving the region AX within the predetermined range from the center of the block of interest B(t: i, j).

Note that "$MV_{neighbor}$" may be motion vectors of blocks surrounding the block of interest B(t: i, j), for example, 4 blocks on the left, right, top and bottom, one of the 8 blocks surrounding the block of interest B(t: i, j) (one round), or blocks having the same ID as the estimated ID of the block of interest B(t: i, j) within 24 blocks surrounding the block of interest B(t: i, j) (two rounds). "$MV_{neighbor}$" may be approximated by a corresponding motion vector at time (t−1). That is, letting "B(t−1, p, q)" be a block to which the center of a region, which is obtained by moving the block of interest B(t: i, j) by −MV, belongs, the motion vector may be a motion vector of a block having the same ID as the estimated motion vector of the block of interest B(t: i, j) within blocks near the block B(t−1,p,q).

Figure 11:
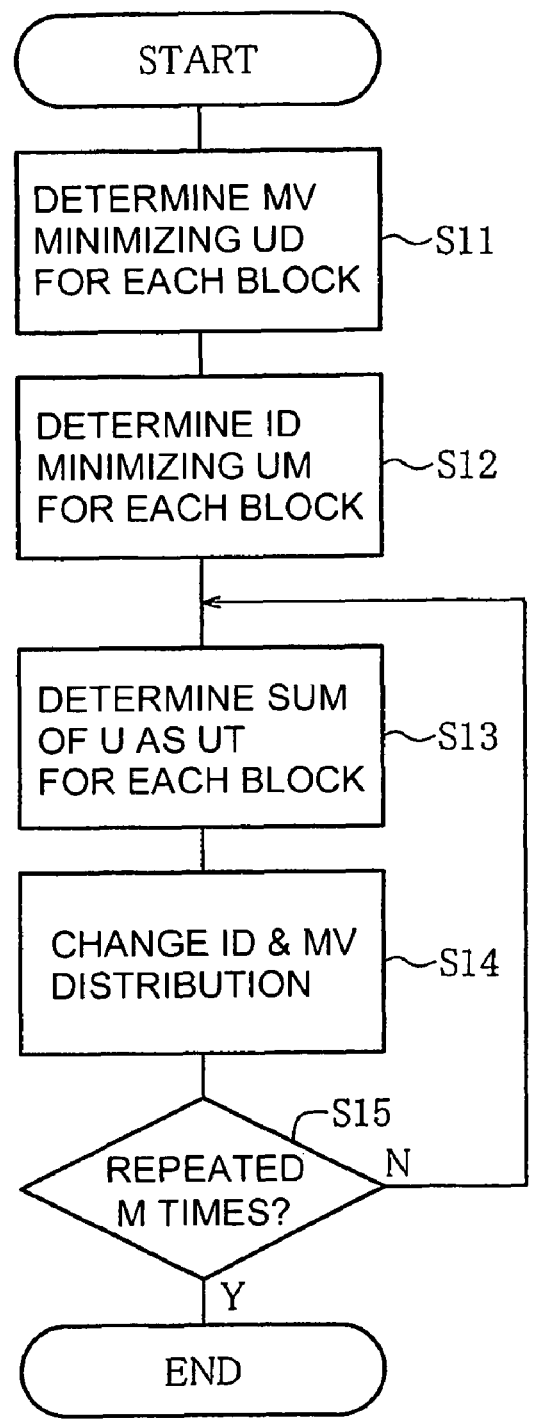
FIG. 11 is a flow chart showing a method of making an object map in accordance with a second embodiment of the present invention.

Since both the sub-estimation functions UN and UV are associated with spatial correlation at time t, ideally, IDs and MVs of all the blocks at time t is determined at the same time by obtaining the minimum value of the estimation function U regarding all the blocks. Practically, the IDs and MVs are determined in accordance with the approximation method as shown in FIG. 11 in order to reduce processing time and thus allow real-time processing.

(S11) A motion vector MV, which minimizes the value of the estimation function UD of the above equation (2), is determined for each block that includes a portion of a moving object at time t. There is a exception that motion vectors MV are not obtained for blocks unsuitable for determining motion vectors. Then, a motion vector MV, which minimizes the value of the estimation function UV of Equation (5), is obtained for each of the blocks unsuitable for determining motion vectors. In this case, the procedure of steps S1 to S3 and S6 of FIG. 8 may be added to uniquely determine the motion vectors.

(S12) An ID is determined for each block having a motion vector MV in such a way that the value of the estimation function UM of Equation (3) is minimized. This motion vector MV, which is obtained at step S11, is fixed. For the first image to which no ID is assigned at time (t−1), the same ID is assigned to adjacent blocks if the absolute value of the difference between motion vectors of the adjacent blocks are less than a predetermined value.

(S13) The sum UT of the values of the estimation functions U for blocks, IDs and MVs of which have been determined, is calculated.

(S14) The distribution of IDs and MVs is changed in order to obtain a distribution of IDs and MVs which makes the sum UT smaller.

(S15) If it is determined that steps S13 and S14 have been repeated a predetermined number of times or if it is determined that the sum UT converges to a certain value, then the procedure is terminated, else it returns to step S15.

In this manner, it is possible to obtain, in real-time, an ID and MV distribution that approximately minimizes the sum UT.

For example, at step S14, the motion vector MV of one block is shifted pixel-by-pixel within a predetermined range, or the ID of one block is changed. Then, the procedure returns to step S13, and if the sum UT is larger than the previous one, the changed MV or ID is restored at step S14. If the sum UT is less than the previous one, like change is made to the next block. The predetermined range is, for example, ±4 pixels in each direction of left, right, top and bottom of the block.

If the MV or ID of one block is changed, the change will not affect the evaluation functions of all blocks. Therefore, it is also possible to approximately minimize the sum $UT_{portion}$ of the values of evaluation functions U of only blocks affected by the change, without calculating the sum UT. In this case, it is possible to determine whether or not each block is affected by the change, by temporarily storing the value of the evaluation function U of each block and comparing the current value thereof with the previous one thereof.

In addition, instead of repeating the procedure of steps S13 to S15, it is also possible to previously estimate a procedure for making the sum UT smaller, perform the estimated procedure to calculate the sum UT or $UT_{portion}$, and then adopt its object map if the value of the sum UT or $UT_{portion}$ is smaller than the value previous to the procedure, else adopt the previous object map. An example of the estimated procedure is spatial averaging of motion vectors on the basis of Equation (5). That is, since the value of Equation (5) can be minimized when "MV" in Equation (5) is set to be equal to "$\Sigma MV_{neighbor}/L$", "MV" is set to be equal to "$\Sigma MV_{neighbor}/L$" with using previously obtained "$MV_{neighbor}$".

Further, at step S11, without determining the motion vectors for blocks unsuitable for determining motion vectors, the motion vector of each of the blocks unsuitable for determining motion vectors may be determined through the procedure of steps S13 to S15 or the alternative procedure as described above.

The following are experimental results of the second embodiment.

The constants "a", "b", "c" and "f" in Equation (1) were determined as "a=32/100000", "b=1/256", "c=1/2", and "f=1/4" by trial and error. The spatial averaging of motion vectors was performed as described above, instead of repeating the steps S13 to S15.

Figure 15:
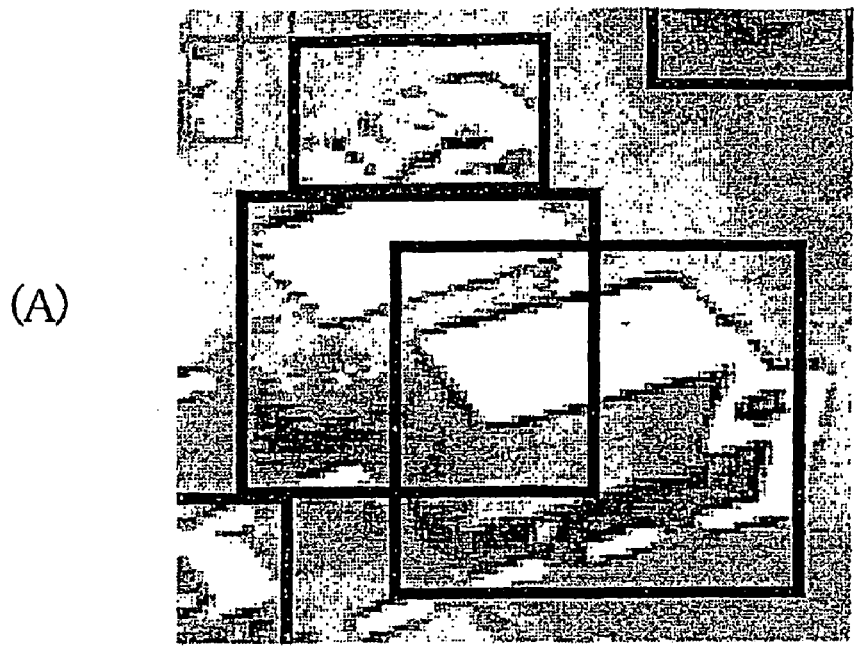
FIGS. 15(A) and 15(B) are views, showing experimental results of the second embodiment of the present invention, of a captured picture of an intersection and of a corresponding object map of IDs, respectively.

FIGS. 15(A) and 15(B) illustrate a captured picture of an intersection, and a corresponding object map of IDs, respectively. Bold lines therein indicate rectangular regions, each having the same ID.

Figure 16:
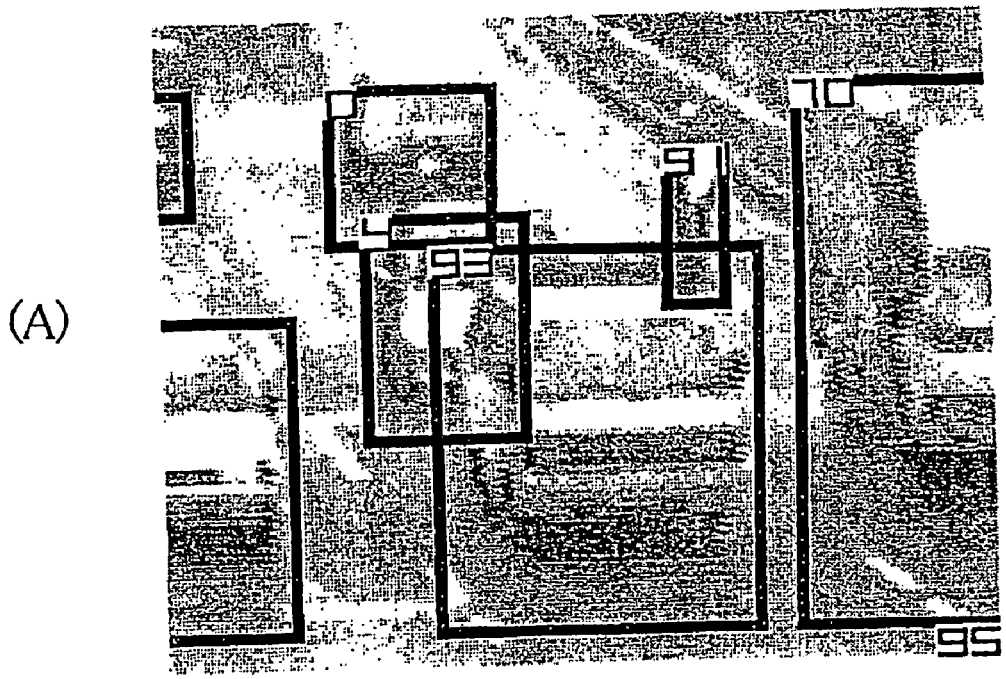
FIGS. 16(A) and 16(B) are views, showing experimental results of the second embodiment of the present invention, of a picture of an expressway captured at a low camera angle, and of a corresponding object map of IDs, respectively.

FIGS. 16(A) and 16(B) illustrate a picture of an expressway captured at a low camera-angle, and a corresponding object map of IDs, respectively.

Figure 17:
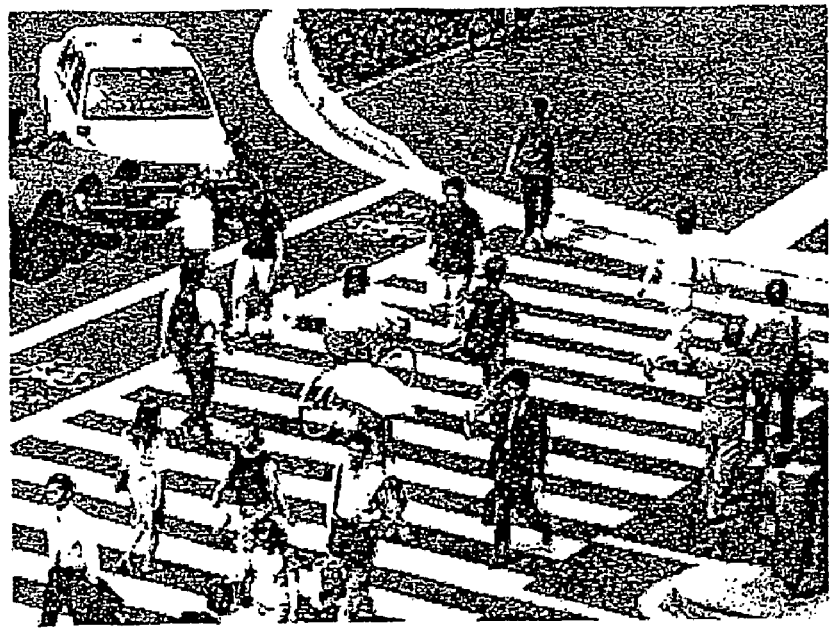
FIGS. 17(A) and 17(B) are views, showing experimental results of the second embodiment of the present invention, of a captured picture of a crosswalk, and of a picture made by overlapping the captured crosswalk picture with a mesh of ID-assigned portions of a corresponding object map, respectively.
Figure 17:
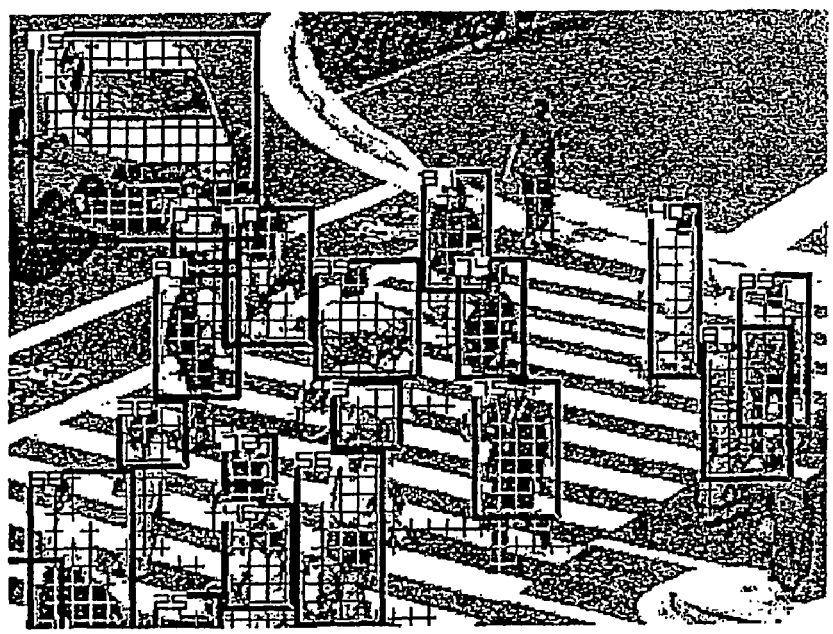

FIGS. 17(A) and 17(B) illustrate a captured picture of a crosswalk, and a picture made by overlapping the captured crosswalk picture with a mesh of ID-assigned portions of a corresponding object map, respectively.

Numbers assigned to rectangular regions in FIGS. 16(A) and 17(B) indicate object IDs.

Such crowding and overlapping moving objects could be tracked.

Third Embodiment

If there are a large number of estimated motion vectors on both sides of the boundary between objects as shown in FIG. 10(C), and if the absolute value of the difference between motion vectors on both sides of the boundary is relatively small, the accuracy of the object boundary is low. In this case, the tracking accuracy is also low when objects are tracked backward in time.

This problem can be overcome by increasing the predetermined value in the rule that "the same ID is assigned to adjacent blocks if the absolute value of the difference between motion vectors MV of the adjacent blocks are less than the predetermined value". However, this causes a delay in the start time of the tracking backward in time.

Figure 18:
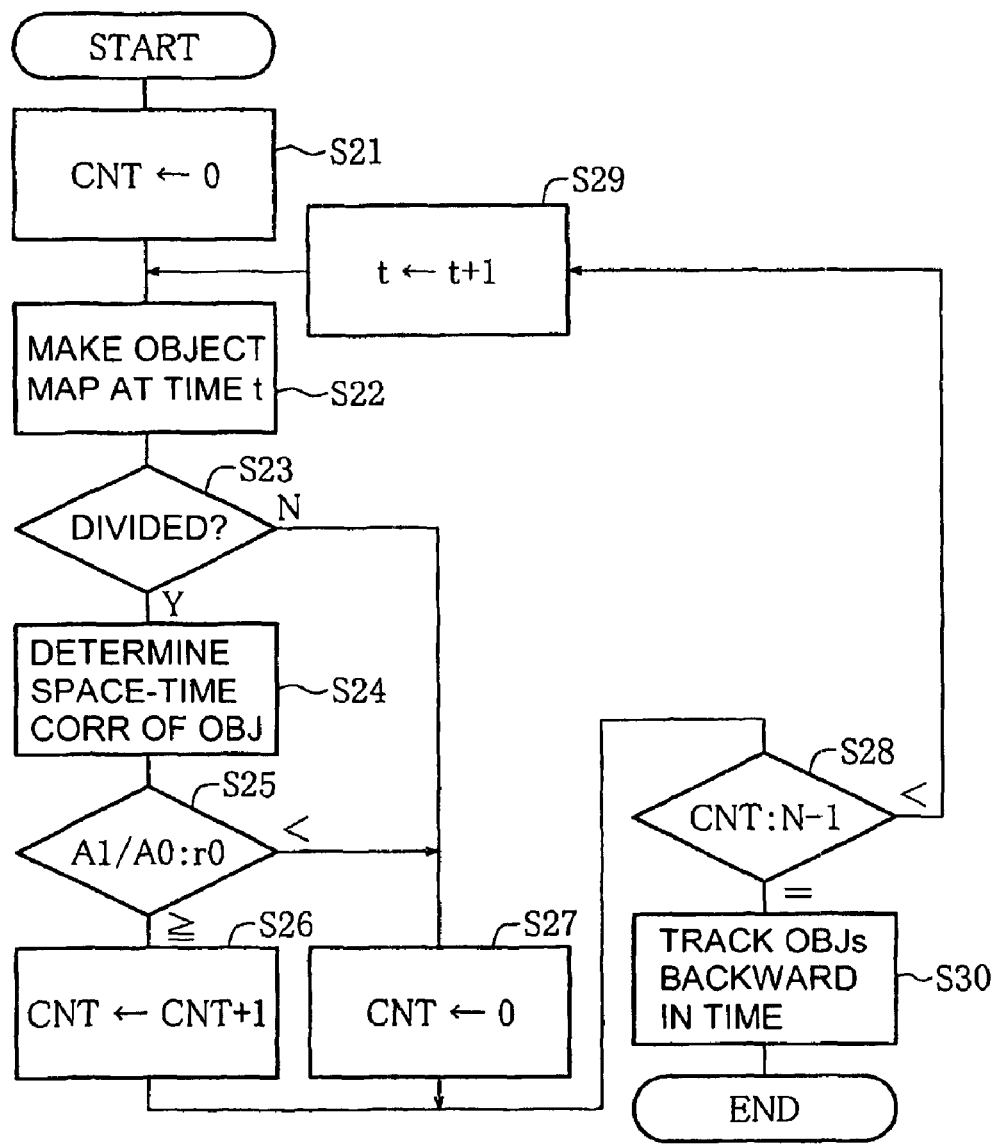
FIG. 18 is a flow chart showing a method of determining whether or not object boundaries, through which a cluster is divided into objects, are established, according to a third embodiment of the present invention.

To overcome these problems, according to the third embodiment of the present invention, the start time of the tracking backward in time is determined by performing a method as shown in FIG. 18. In this method, the reliability of the object boundary is determined to be high if the correlations (space-time correlation of objects) between corresponding objects in temporally adjacent pictures within N consecutive pictures, for example, 3 consecutive pictures, are more than a predetermined value.

Figure 19:
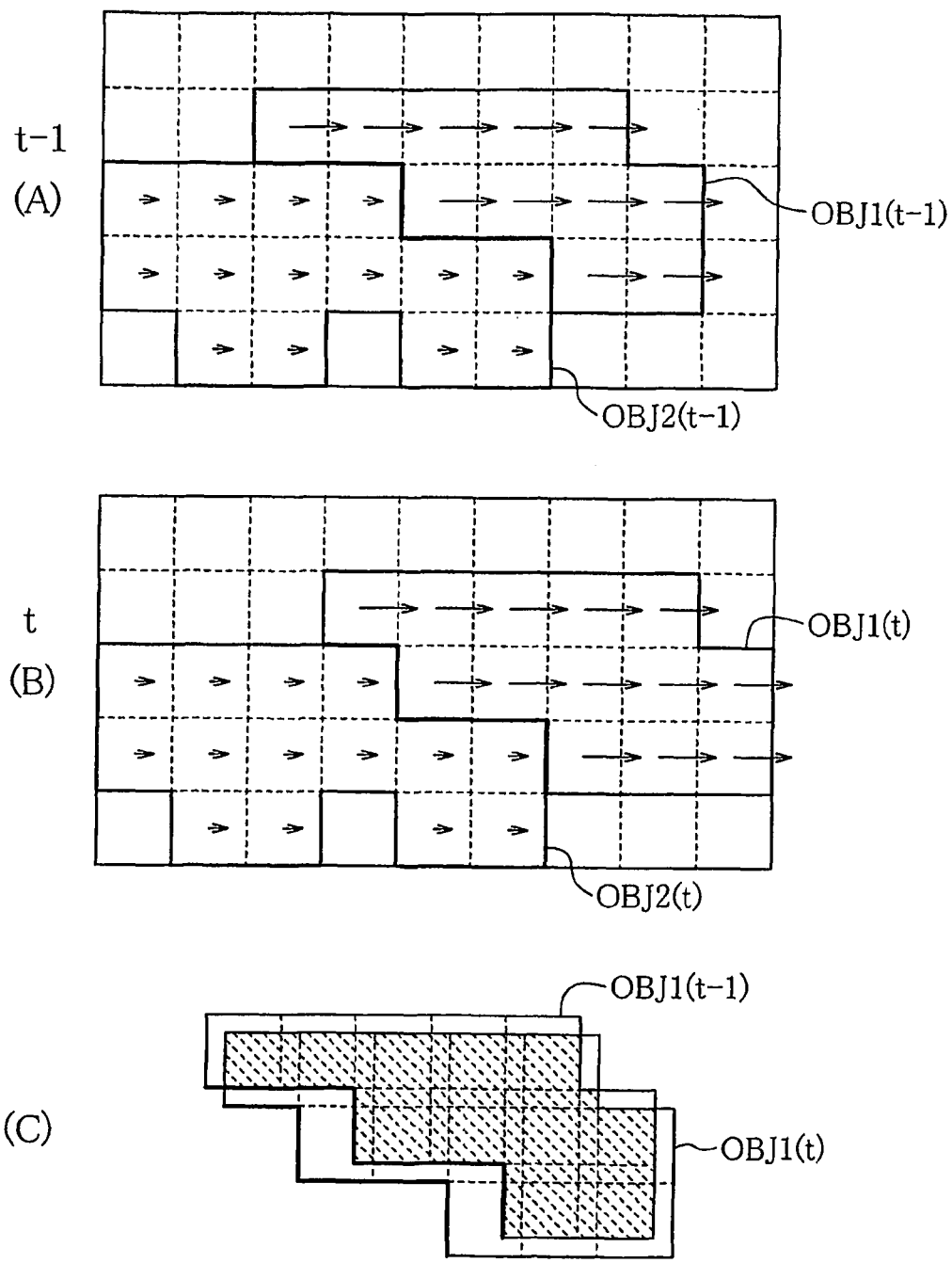
FIGS. 19(A) to 19(C) are schematic diagrams for illustrating the procedure of FIG. 18.

Assume that, for example, an object map at time (t−1) has been made as shown in FIG. 19(A).

(S21) An initial value "0" is assigned to a counter CNT.

(S22) An object map at time t is made through the method as described above in the first embodiment. FIG. 19(B) illustrates the object map at time t.

(S23) If a plurality of objects are included in one cluster, then the procedure goes to step S24, else it goes to step S27.

(S24) A space-time correlation of objects is calculated in regard to the object map at time t and the object map at time (t−1).

For example, an area A1 (a hatched figure in FIG. 19(C)) is determined by performing a logical AND operation between a figure, which is obtained by moving an object OBJ1(t −1) shown in FIG. 19(A) by an average motion vector of the object OBJ1(t−1), and a figure of a corresponding object OBJ1(t) shown in FIG. 19(B). An area A0 of the figure of the object OBJ1(t−1) is also calculated. Then, the ratio of the areas "A1/A0" is calculated as the correlation. The area A0 may be the area of the figure of the object OBJ1(t).

(S25) If the ratio A1/A0 is more than or equal to a predetermined value r0, then the procedure goes to step S26, else it goes to step S27.

(S26) The counter CNT is incremented by one, and the procedure goes to step S28.

(S27) The counter CNT is cleared to zero.

(S28) If CNT<N−1, then the procedure goes to step S29, else it goes to step S30.

(S29) The next time "t+1" is set as "t", and the procedure returns to step S21.

(S30) The space-time correlation of the objects is determined to be high, and the objects are tracked backward in time from time "t".

Fourth Embodiment

Figure 20:
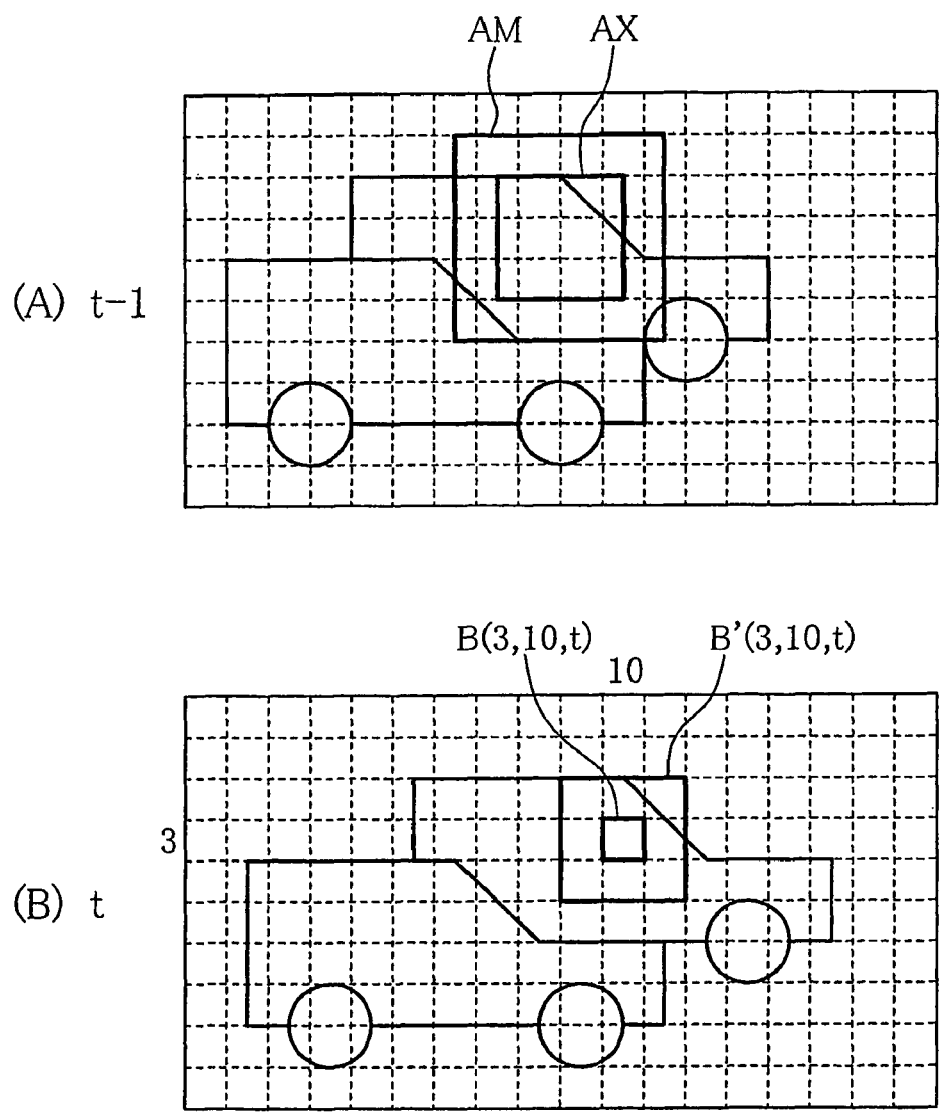
FIGS. 20(A) and 20(B) are schematic diagrams, for illustrating block matching according to a fourth embodiment of the present invention, and showing a picture at time (t−1) and a picture at time t, respectively, with block boundary lines.

FIG. 20 are illustrations of object maps according to the fourth embodiment of the present invention.

The accuracy of object boundary is increased if a block size is reduced. However, the smaller the block size is, the more difficult it is to determine the motion vector through the use of block matching.

To overcome this problem, in the fourth embodiment of the present invention, for each block B(i, j) to which an ID and a motion vector MV are to be assigned, the size of a block B'(i, j) used to determine the motion vector of the block B(i,j) is set to be larger than the size of the block B(i, j). The block B'(i, j) is concentric with the block B(i, j), and the block B(i, j) is included in the block B'(i, j).

For example in FIG. 20, a block B'(t: 3, 10) is used to obtain the motion vector of a block B(t: 3, 10). In like manner as in the case of FIG. 5, the texture correlation between an image of the block B'(t: 3, 10) and an image of a corresponding block-size region AX at time (t−1) is calculated for every block-size region AX moved pixel-by-pixel within a predetermined range AM.

The other features of the fourth embodiment are the same as those of the first to third embodiments.

Fifth Embodiment

In the above embodiments, it is necessary to specially handle the background picture since each block is compared with a corresponding block of the background picture to determine whether or not an object is present in the block. In addition, if the camera shakes, the camera shaking cannot be reflected in the background picture since the background picture is generated on the basis of pictures captured for the past, for example, 10 minutes.

To overcome these problem, in the fifth embodiment of the present invention, a background image is also regarded as an object in generating an object map. The object map generation method is same as that of any one of the first to fourth embodiments, except that it does not determine whether or not an object is present in a block on the basis of comparison with the background picture. Since a background image is also regarded as an object, block matching is performed for each block to assign an identification ID and determine a motion vector MV for each block.

Figure 21:
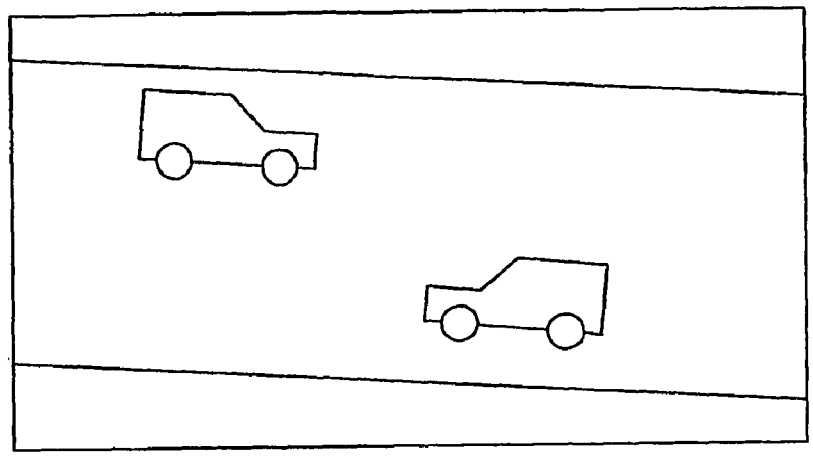
FIGS. 21(A) and 21(B) are schematic diagrams, for illustrating a fifth embodiment of the present invention, of a captured picture and a corresponding object map of motion vectors obtained at a first step, respectively.
Figure 21:
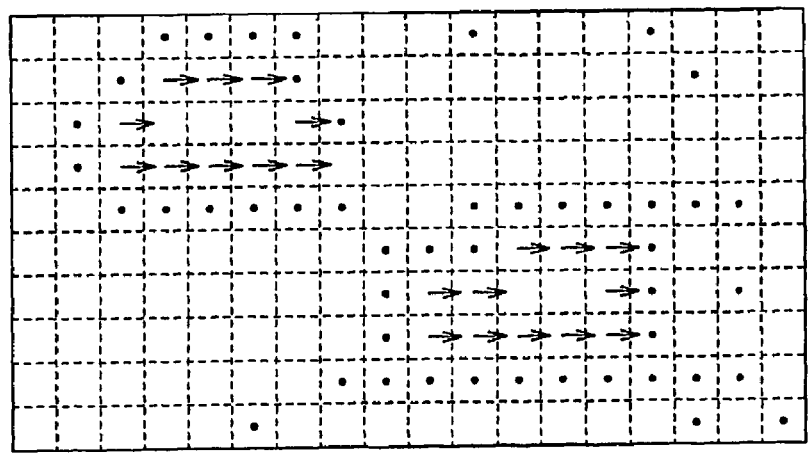
Figure 22:
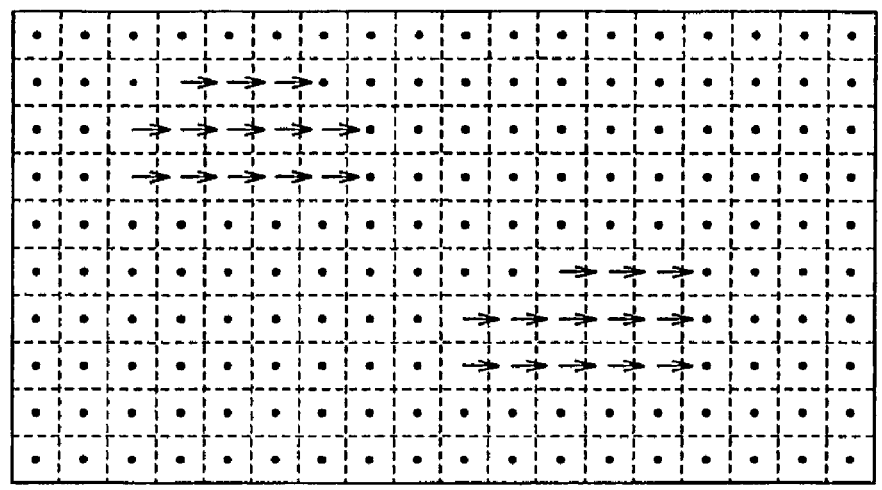
FIGS. 22(A) and 22(B) are schematic diagrams, for illustrating the fifth embodiment of the present invention, showing an object map of motion vectors obtained at a second step and a corresponding object map of IDs, respectively.

Next, the procedure for making an object map at time t through the method of FIG. 11 will be schematically described with reference to FIGS. 21 and 22.

(S11) A motion vector MV, which minimizes the value of the estimation function UD of Equation (2), is determined for each block at time t. However, motion vectors MV are not determined for blocks unsuitable for determining motion vectors.

That process is performed for a picture as shown in FIG. 21(A) to obtain an object map of motion vectors as shown in FIG. 21(B). In FIG. 21(B), dotted lines denote boundary between blocks, and dots denote motion vectors of zero.

Next, a motion vector MV, which minimizes the value of the estimation function UV of Equation (5), is obtained for each of the blocks unsuitable for determining motion vectors. This process makes an object map of motion vectors as shown in FIG. 22(A).

The procedure of steps S12 to S15 is same as that of the second embodiment.

The process of step S12 makes an object map of IDs as shown in FIG. 22(B).

This method eliminates the need to use a special background picture, and also makes it possible to recognize a background picture even when the camera shakes. In addition, there is no need to set an entrance slit on the picture. Furthermore, the need to use exit slits can be eliminated by deleting the ID of an object when the object has exited the frame of a captured picture.

Sixth Embodiment

In the above embodiments, a picture is divided into blocks, and an object identification ID and an object motion vector MV are determined for each block, so that it is not possible to track a portion (for example, a block-size region) of a moving object, which is unrelated to boundaries between blocks.

In the sixth embodiment of the present invention, a picture is divided into blocks and an object identification ID and an object motion vector MV are determined for each block, and a portion of a moving object, which is unrelated to boundaries between the blocks, is also tracked.

Figure 23:
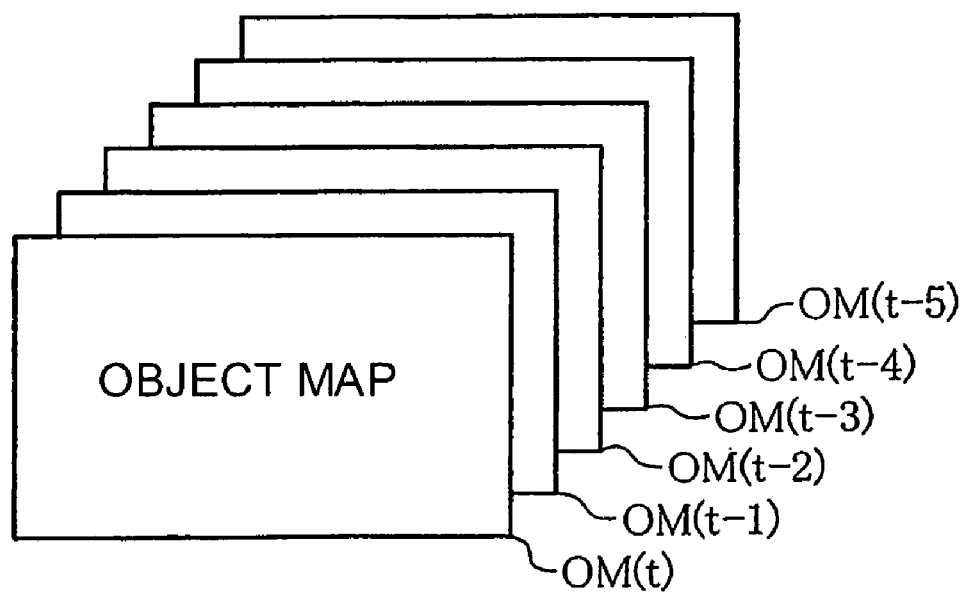
FIG. 23 is a schematic diagram illustrating time-series object maps used in a method of tracking a region of interest according to a sixth embodiment of the present invention.

As shown in FIG. 23, object maps OM(t) to OM(t−5), which respectively correspond to time-series pictures at times "t" to "t−5", have been stored in the object map storage section 26 of FIG. 2.

At the next time, time "t" is replaced with time "t−1", i.e., object maps OM(t) to OM(t−5) becomes object maps OM(t−1) to OM(t−6), respectively. In addition, the oldest object map OM(t−6) is updated to a new object map OM(t).

The moving object tracking section 27 of FIG. 2 performs tracking of a portion of a moving object in the following manner.

Figure 24:
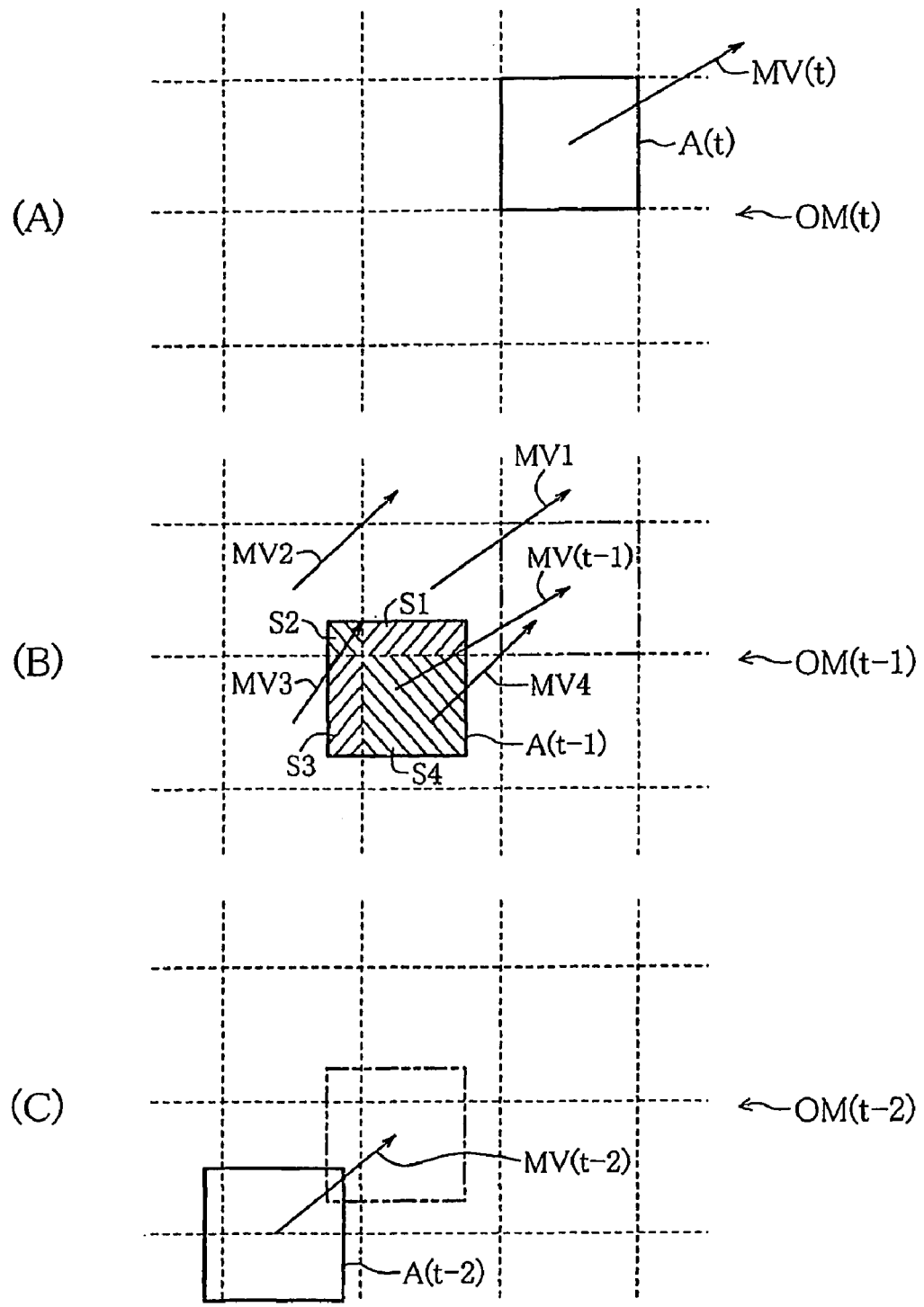
FIGS. 24(A) to 24(c) are schematic diagrams for illustrating how a region of interest is tracked backward in time according to the sixth embodiment of the present invention.

In FIG. 24(A), assume that "MV(t)" is the motion vector of a region of interest A(t) on the object map OM(t). Dotted lines in FIG. 24(A) denote boundaries between blocks. In this example, the region of interest A(t) coincides with one block.

As shown in FIG. 24(B), a region of interest A(t−1) on the object map OM(t−1) is determined with moving the region of interest A(t) by −MV(t).

A motion vector MV(t−1) of the region of interest A(t−1) is calculated through the use of following weighted averaging.

$$MV(t-1)=(MV1 \cdot S1+MV2 \cdot S2+MV3 \cdot S3+MV4 \cdot S4)/(S1+S2+S3+S4)$$

where "MV1" to "MV4" denote the motion vectors of first to fourth blocks overlapping with the region of interest A(t−1), and "S1" to "S4" denote the number of pixels of respective portions of the first to fourth blocks, which overlap with the region of interest A(t−1).

As shown in FIG. 24(C), a region of interest A(t−2) on the object map OM(t−2) is obtained by moving the region of interest A(t−1) by −MV(t−1).

A motion vector MV(t−2) of the region of interest A(t−2) is calculated in the same manner as described above.

By repeating such movement of the region of interest and motion vector calculation thereof after the movement, it is possible to track the region of interest, independently of the boundaries of blocks. That is, for the region of interest A(t), it is possible to obtain corresponding regions of interest A(t−1) to A(t−5) at times (t−1) to (t−5).

According to the sixth embodiment, it is possible to track a region of interest which is a portion of a moving object, and thereby, for example, it is possible to analyze or classify a movement pattern of the region of interest or to judge it as a specific movement pattern. It is also possible to analyze or classify a movement pattern of the relative positions of a plurality of regions of interest or to judge it as a specific movement pattern.

Although the above example has been described for the case where the region of interest at time t coincides with one block, a case may be where the region of interest does not coincide with a block as shown in FIG. 24(B). In this case, the motion vector of the region of interest is calculated through the use of weighted averaging as described above.

In addition, although the above example has been described for the case where the region of interest is tracked backward in time, it is also possible to track the region of interest forward in time, starting from the region of interest A(t−5) on the object map OM(t−5), by moving the region of interest with the motion vector in the positive direction thereof. In this case, it is possible to track a region of interest by determining a corresponding region of interest A(t) each time a new object map OM(t) is obtained.

The size of the region of interest may be smaller or larger than the block size.

Seventh Embodiment

Next, an example where boundaries between objects are identified using the method of the sixth embodiment will be described as a seventh embodiment of the present invention.

Figure 25:
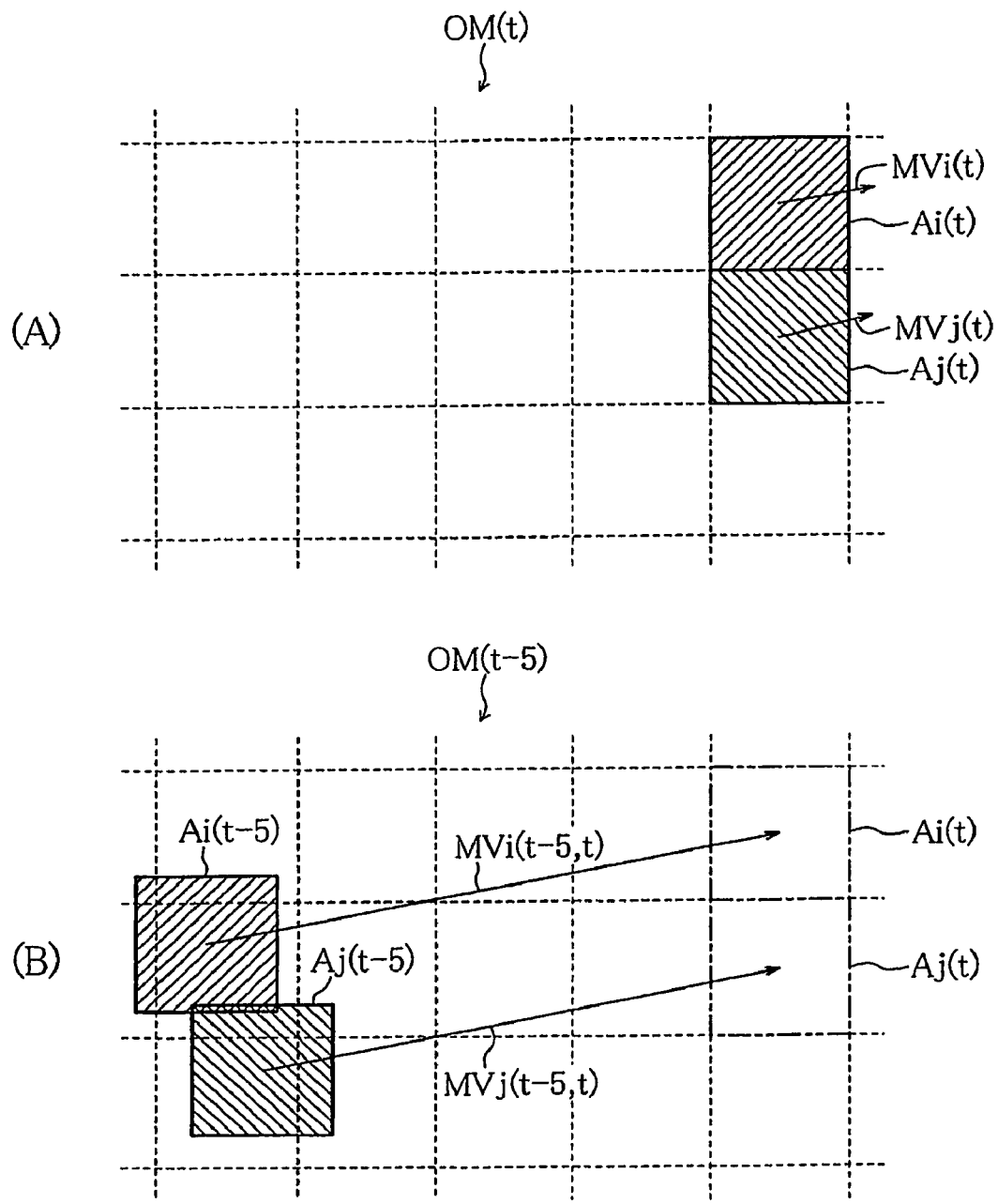
FIGS. 25(A) and 25(B) are schematic diagrams for illustrating a method of recognizing object boundaries according to a seventh embodiment of the present invention.

In FIG. 25(A), assume that "MVi(t)" and "MVj(t)" are the motion vectors of adjacent regions of interest Ai(t) and Aj(t) on an object map OM(t), respectively. Even when the regions Ai(t) and Aj(t) are portions of different moving objects, it is not possible to recognize the regions as different moving objects if |MVi(t)−MVj(t)| is relatively small. Particularly, this problem occurs when a plurality of moving objects located far away from the camera are seen to be overlapped.

Therefore, regions of interest Ai(t−5) and Aj(t−5) on the object map OM(t−5) are determined with using the method of the above sixth embodiment. A motion vector from the center of the region Ai(t−5) to the center of the region Ai(t) is obtained as a fast-forward motion vector MVi(t−5, t). In the same manner, a motion vector from the center of the region Aj(t−5) to the center of the region Aj(t) is obtained as a fast-forward motion vector MVj(t−5, t). If the value of |MVi(t−5, t)−MVj(t−5, t)| exceeds a predetermined value "ϵ", it is recognized that the boundary between the two regions of interest Ai(t) and Aj(t) is identified to a boundary between different moving objects.

By performing such a process for all adjacent blocks in a cluster on the object map OM(t), it is possible to recognize a plurality of divided moving objects included in the cluster.

In the above example, the case is described in which a value of "k" in |MVi(t−k, t)−MVj(t−k, t)| is equal to 5. However, it is preferable to increase the value "k" as the relative speed of moving objects in the picture, which are seen to be overlapped, decreases.

Figure 26:
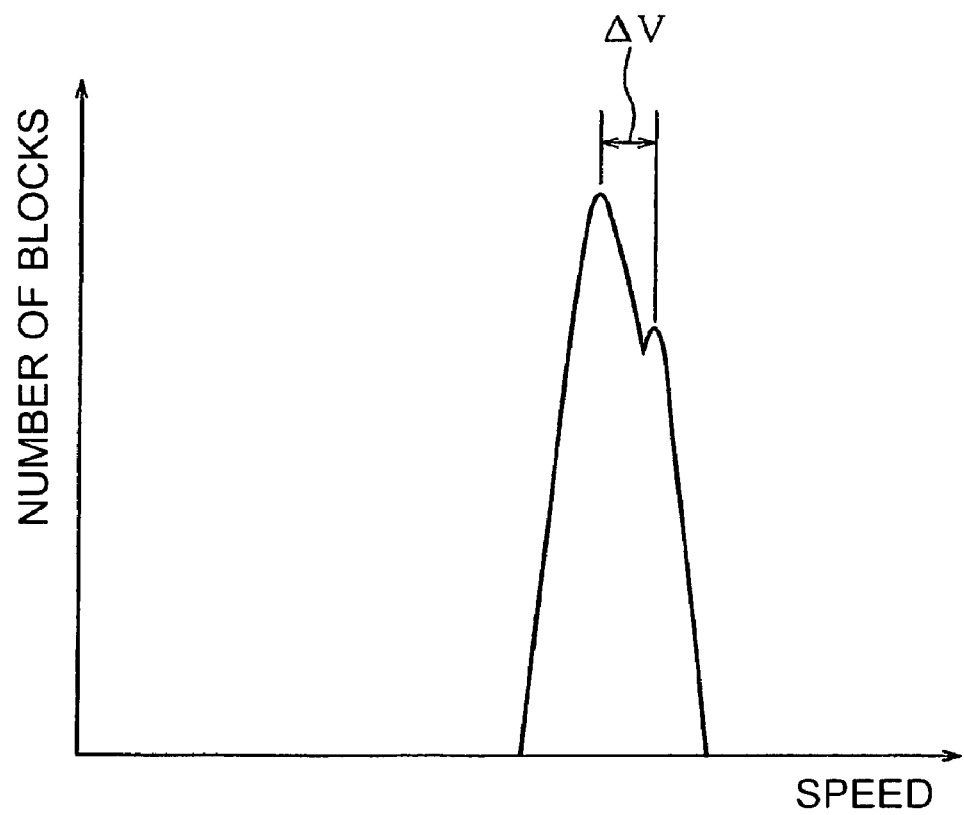
FIG. 26 is a schematic diagram illustrating a histogram of the absolute values of motion vectors for a single cluster.

Thus, as shown in FIG. 26, a histogram of absolute values of motion vectors is made for a single cluster. If there are a plurality of peaks in the histogram, it is possible to estimate that a plurality of moving objects are included in the cluster. Letting "ΔV" be the distance between the peaks, the value "k" is determined as k=[αΔV], where "α" is a constant determined by trial and error, and "[ ]" designates to round off to the nearest integer.

Eighth Embodiment

Figure 27:
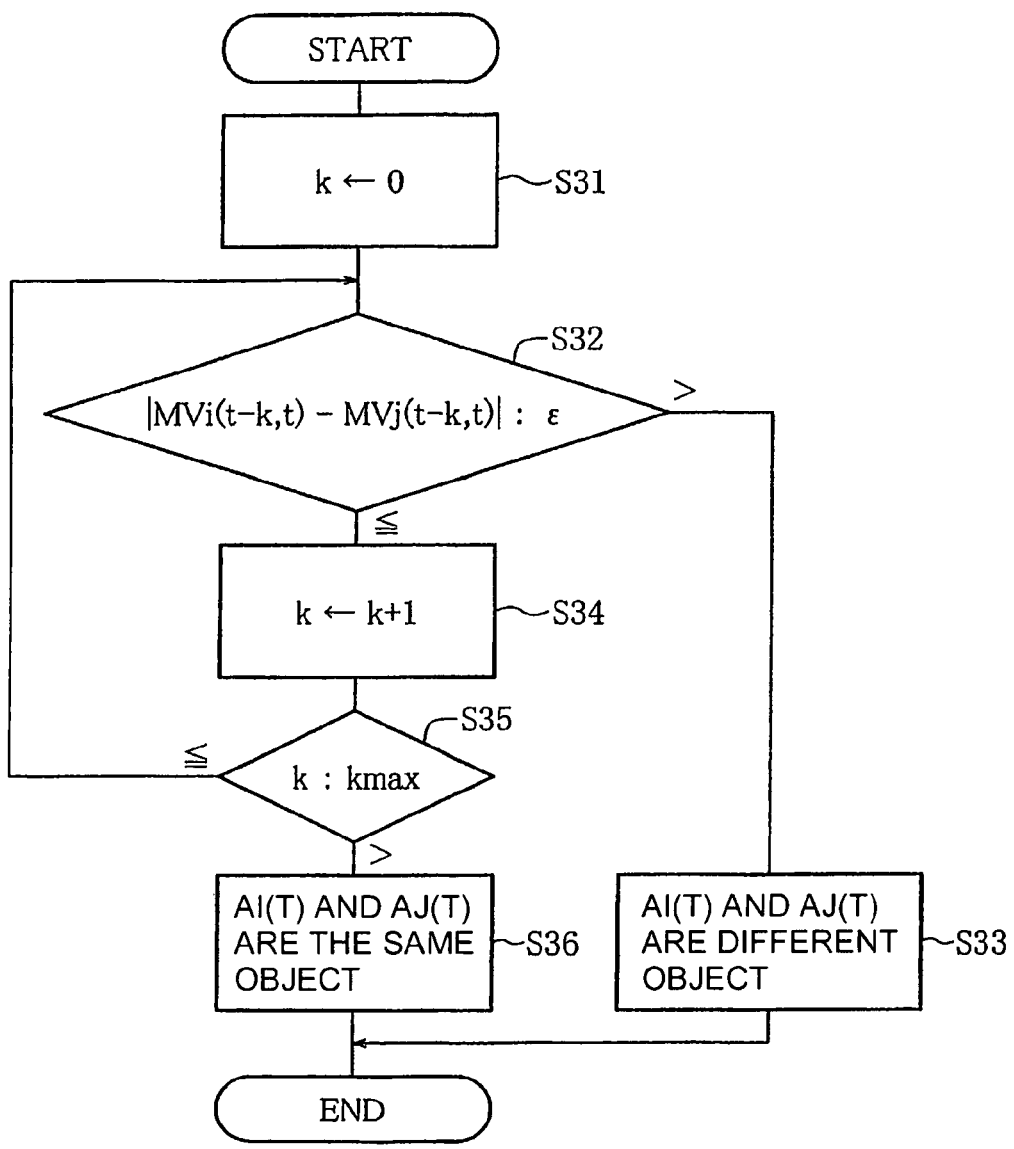
FIG. 27 is a flow chart showing a method of recognizing object boundaries according to an eighth embodiment of the present invention.

FIG. 27 is a flow chart of a method of recognizing the boundary between moving objects in accordance with an eighth embodiment of the present invention.

In this method, the histogram is not made, but instead, the value "k" is changed from "0" to "kmax" for the two regions of interest of FIG. 25(A) in the following manner. The "kmax" is equal to, for example, "5" in the case of 10 frames/sec.

(S31) An initial value "0" is assigned to "k".

(S32) If |MVi(t−k, t)−MVj(t−k, t)>ϵ holds, then the procedure goes to step S33, else it goes to step S34.

(S33) The boundary between the two regions of interest Ai(t) and Aj(t) is recognized as a boundary between different moving objects.

(S34) The value "k" is incremented by one.

(S35) If k>kmax holds, the procedure goes to step S36, else it returns to step S32.

(S36) It is recognized that the two regions of interest Ai(t) and Aj(t) belong to the same moving object.

The other features are same as those of the seventh embodiment.

According to the eighth embodiment, the value "k" is automatically determined without making the histogram.

Note that the present invention includes other various modifications.

For example, although the above embodiments have been described for the case where moving objects are tracked by processing spatial differential pictures, there may be configuration of tracking moving objects (or portions thereof) by processing various types of edge images or the original pictures according to the present invention.

What is claimed is:

1. An apparatus for tracking moving objects in time-series pictures, comprising:
   a non-transitory storage device for storing the time-series pictures and a program;
   and a processor coupled to the storage device, wherein the program makes the processor read and process the time-series pictures to track the moving objects in the pictures, and by the processing, each picture is divided into blocks, each block consisting of a plurality of pixels, in a case where an object-identification code of a moving object is assigned in a block unit, and a motion vector of a moving object is determined in a block unit, and wherein object-identification codes of a plurality of moving objects on a picture at a time t1 have been determined, and the program enables the processor to perform the steps of:

determining each object-identification code and moving vector as approximate values of each of the blocks on a picture at a time t2 on the basis of a first estimation function, and determining a value of a second estimation function using the approximate values;

determining each object-identification code and moving vector as a solution of each of the blocks on the basis of an approximately-optimum sum of the first and second estimation functions, wherein the approximately-optimum sum is obtained by changing the approximate values within a given range;

wherein the first estimation function has the sum of a sub-estimation function for determining a moving vector by block matching between a current block on the picture at the time t2 and a region on the picture at the time t1 and a sub-estimation function for determining an object-identification code of the current block on the basis of a count of pixels belonging to the same object-identification code within the region, wherein the second estimation function includes respective absolute values of differences between the motion vector MV between the current block and the region and a motion vector of each of the blocks around the current block, each of the blocks having the same object-identification code as that of the current block, and takes a more optimum value when the sum of the absolute values is smaller.

2. The apparatus according to claim 1, wherein the second estimation function includes $\Sigma|MV - MV_{neighbor}|/L$, where $MV_{neighbor}$ denotes a motion vector of a block having the same object-identification code ID of the current block within blocks surrounding the current block, $\Sigma$ denotes a sum over the blocks having said same object-identification code ID, and L denotes a number of the blocks having said same object-identification code ID.

3. A method of tracking moving objects in time-series pictures by processing the pictures using a processor, each picture being divided into blocks, each block consisting of a plurality of pixels, wherein a case where an object-identification code of mobbing object is assigned in a block unit, and a motion vector of a moving object is determined in a block unit, and wherein object-identification codes of a plurality of moving objects on a picture at a time t1 have been determined, in which the method using the processor comprises the steps of:

determining each object-identification code and moving vector as approximate values of each of the blocks on a picture at a time t2 on the basis of a first estimation function, determining a value of a second estimation function using the approximate values; and determining each object-identification code and moving vector as a solution of each of the blocks on the basis of an approximately-optimum sum of the first and second estimation functions, wherein the approximately-optimum sum is obtained by changing the approximate values within a given range;

wherein the first estimation function has the sum of a sub-estimation function for determining a moving vector by block matching between a current block on the picture at time t2 and a region on the picture at the time t1 and a sub-estimation function for determining an object-identification code of the current block on the basis of a count of pixels belonging to the same object-identification code within the region, wherein the second estimation function has the sum of a sub-estimation function for determining a moving vector by block matching between a current block on the picture at the time t2 and a region on the picture at the time t1 and a sub-estimation function for determining an object-identification code of the current block on the basis of a count of pixels belonging to the same object-identification code within the region, wherein the second estimation function includes respective absolute values of differences between the motion vector MV between current block and the region and a motion vector of each of the blocks around the current block, each of the blocks having the same object-identification code as that of the current block, and takes a more optimum value when the sum of the absolute values is smaller.

4. The method according to claim 3, wherein the second estimation function includes $\Sigma|MV - MV_{neighbor}|/L$, where $MV_{neighbor}$ denotes a motion vector of a block having the same object-identification code ID of the current block within blocks surrounding the current block, $\Sigma$ denotes a sum over the blocks having said same object-identification code ID, and L denotes a number of the blocks having said same object-identification code ID.

5. An apparatus for tracking moving objects in time-series pictures, comprising:

a non-transitory storage device for storing the time-series pictures and a program;

and a processor coupled to the storage device, wherein the program makes the processor read and process the time-series pictures to track the moving objects in the pictures, and by the processing, each picture is divided into blocks, each block consisting of a plurality of pixels, the program comprising the steps of:

(b1) determining motion vectors of respective blocks in a picture at a time t2 through the use of block matching between a picture at a time t1 and the picture at the time t2, without discriminating between the background image and moving objects;

(b2) determining motion vectors of blocks which are not determined at the step (b1) by estimating the motion vectors through the use of the method according to any one of claim 3 or 4; and (b3) assigning the same identification code to adjacent blocks if an absolute value of a difference between motion vectors of the adjacent blocks is less than a predetermined value.

6. A method according to any of claim 3 or 4, wherein a background image is regarded as a moving object.

7. A method of tracking moving objects in time-series pictures with processing the pictures by a processor, the method using the processor comprising the steps of:

(a) dividing each picture into blocks, each block consisting of a plurality of pixels; and (b) with regarding a background image as a moving object, assigning an identification code of moving object in a block unit and determining a motion vector of the moving object in a unit of block;

wherein the step (b) comprises the steps of:

(b1) determining motion vectors of respective blocks in a picture at a time t2 through the use of block matching between a picture at a time t1 and the picture at the time t2, without discriminating between the background image and moving objects;

(b2) determining motion vectors of blocks which are not determined at step (b1) by estimating the motion vectors through the use of the method according to any one of claim 3 or 4; and (b3) assigning the same identification code to adjacent blocks if an absolute value of a difference between motion vectors of the adjacent blocks is less than a predetermined value.

8. An apparatus for tracking moving objects in time-series pictures, comprising:

a non-transitory storage device for storing the time-series pictures and a program;

and a processor coupled to the storage device, wherein the program makes the processor read and process the time-series pictures to track the moving objects in the pictures, and by the processing, each picture is divided into blocks, each block consisting of a plurality of pixels, a plurality of object maps of different times have been stored, each object map having motion vectors of the moving object in a block unit, the program comprising the steps of:

(a) determining respective motion vectors of first and second regions adjacent to each other on one at time t1 of the plurality of object maps; and (b) determining respective motion vectors of two regions, to which the first and second regions are moved with using the determined motion vectors, respectively, in a positive or negative direction thereof, on the basis of an object map at a time corresponding to completion of the movement of the regions, wherein step (b) is repeated a plurality of times to track, until a time t2, the two regions corresponding to the first and second regions, wherein the first region at the time t1 is a single cluster including adjacent blocks, and wherein at step (a) or step (b), for each current region of the two regions, a weighted motion vector average is determined as a motion vector of the current region using motion vectors of blocks overlapping the current region, where weights given to the respective motion vectors correspond to the number of pixels of respective portions overlapping between the respective blocks and the current region, the program further comprising the steps of:

obtaining a motion vector from the first region at time t1 to the corresponding region at time t2 as a first fast-forward motion vector by accumulating corresponding motion vectors between the times t1 and t2, obtaining a motion vector from the second region at time t1 to the corresponding region at time t2 as a second fast-forward motion vector by accumulating corresponding motion vectors between the times t1 and t2;

recognizing the first and second regions at the time t1 as different moving objects if an absolute value of the difference between the first and second fast-forward motion vectors is more than a predetermined value; and if a plurality of peaks are present in a histogram of absolute values of motion vectors of the blocks, determining an interval between the times t1 and t2 on the basis of a speed difference between the peaks.

* * * * *